US012587442B2

(12) United States Patent
Igarashi

(10) Patent No.: US 12,587,442 B2
(45) Date of Patent: Mar. 24, 2026

(54) INFORMATION PROCESSING APPARATUS, METHOD OF REGISTERING DEVICE CONNECTED TO INFORMATION PROCESSING APPARATUS IN SERVER, AND STORAGE MEDIUM

(71) Applicant: CANON KABUSHIKI KAISHA, Tokyo (JP)

(72) Inventor: Toshiaki Igarashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/481,272

(22) Filed: Oct. 5, 2023

(65) Prior Publication Data
US 2024/0129186 A1 Apr. 18, 2024

(30) Foreign Application Priority Data

Oct. 13, 2022 (JP) ................................ 2022-165022

(51) Int. Cl.
*G06F 21/57* (2013.01)
*H04L 9/00* (2022.01)
(Continued)

(52) U.S. Cl.
CPC .......... *H04L 41/0806* (2013.01); *H04L 63/08* (2013.01)

(58) Field of Classification Search
CPC ..... H04L 63/08; H04L 41/0806; H04L 67/54; G06F 3/1222; G06F 3/1231; G06F 3/1287
See application file for complete search history.

(56) References Cited

U.S. PATENT DOCUMENTS 7,747,724 B2 * 6/2010 Wallis .................... H04L 67/51
709/237
8,984,276 B2 * 3/2015 Benson ................. H04L 9/3226
713/155
(Continued)

FOREIGN PATENT DOCUMENTS

JP 2019537381 A 12/2019
WO 2018099647 A1 6/2018

OTHER PUBLICATIONS

Extended European search report issued in European Appln. No. 23201781.4 mailed on Feb. 15, 2024.

*Primary Examiner* — Umar Cheema
*Assistant Examiner* — Golam Mahmud
(74) *Attorney, Agent, or Firm* — ROSSI, KIMMS & McDOWELL LLP

(57) ABSTRACT

An information processing apparatus transmits, to a server, authentication information for login process on servers, and upon success of the login process, searches for a device connected to the information processing apparatus, and in response to an instruction for registering a found device, makes a request to the server for setting information including security setting information for communication between the server and a device to be registered. The information processing apparatus transmits the obtained setting information obtained to the device to be registered, and determines whether the setting information has been reflected in the device and if the setting information has been reflected in the device, transmits, to the server, identification information of the device and makes a request to the server to register the device.

19 Claims, 21 Drawing Sheets

(51) Int. Cl.
    *H04L 9/40*           (2022.01)
    *H04L 29/06*         (2006.01)
    *H04L 41/0806*     (2022.01)
    *H04L 67/51*          (2022.01)
    *H04W 12/04*        (2021.01)

(56)                 References Cited

U.S. PATENT DOCUMENTS

| | | | |
|---|---|---|---|
| 9,582,233 | B1 | 2/2017 | Osadchyy |
| 11,099,793 | B2 * | 8/2021 | Kaneda ..................... B41J 29/38 |
| 11,290,451 | B2 * | 3/2022 | Igari ................... H04L 63/0807 |
| 11,349,882 | B2 | 5/2022 | Verma |
| 11,425,269 | B2 * | 8/2022 | Yano .................... G06F 3/1287 |
| 11,778,118 | B2 * | 10/2023 | Sato .................. H04N 1/00938 |
| | | | 358/1.15 |
| 2005/0033994 | A1 * | 2/2005 | Suzuki .............. H04N 21/6582 |
| | | | 348/E7.071 |
| 2005/0151994 | A1 * | 7/2005 | Takahashi .......... G06K 15/1805 |
| | | | 358/1.15 |
| 2015/0128231 | A1 | 5/2015 | Nakajima |
| 2016/0242024 | A1 | 8/2016 | Karren et al. |
| 2019/0007404 | A1 * | 1/2019 | Igari .................... G06F 21/608 |
| 2019/0332774 | A1 * | 10/2019 | Nix .......................... H04L 9/006 |
| 2019/0379661 | A1 * | 12/2019 | Sato ........................ H04L 67/12 |
| 2020/0319830 | A1 * | 10/2020 | Kaneda ................. G06F 3/1222 |
| 2020/0412815 | A1 * | 12/2020 | Kawahata ............. G06F 3/1268 |
| 2021/0274053 | A1 * | 9/2021 | Yano .................... G06F 3/1287 |

\* cited by examiner

F I G. 1
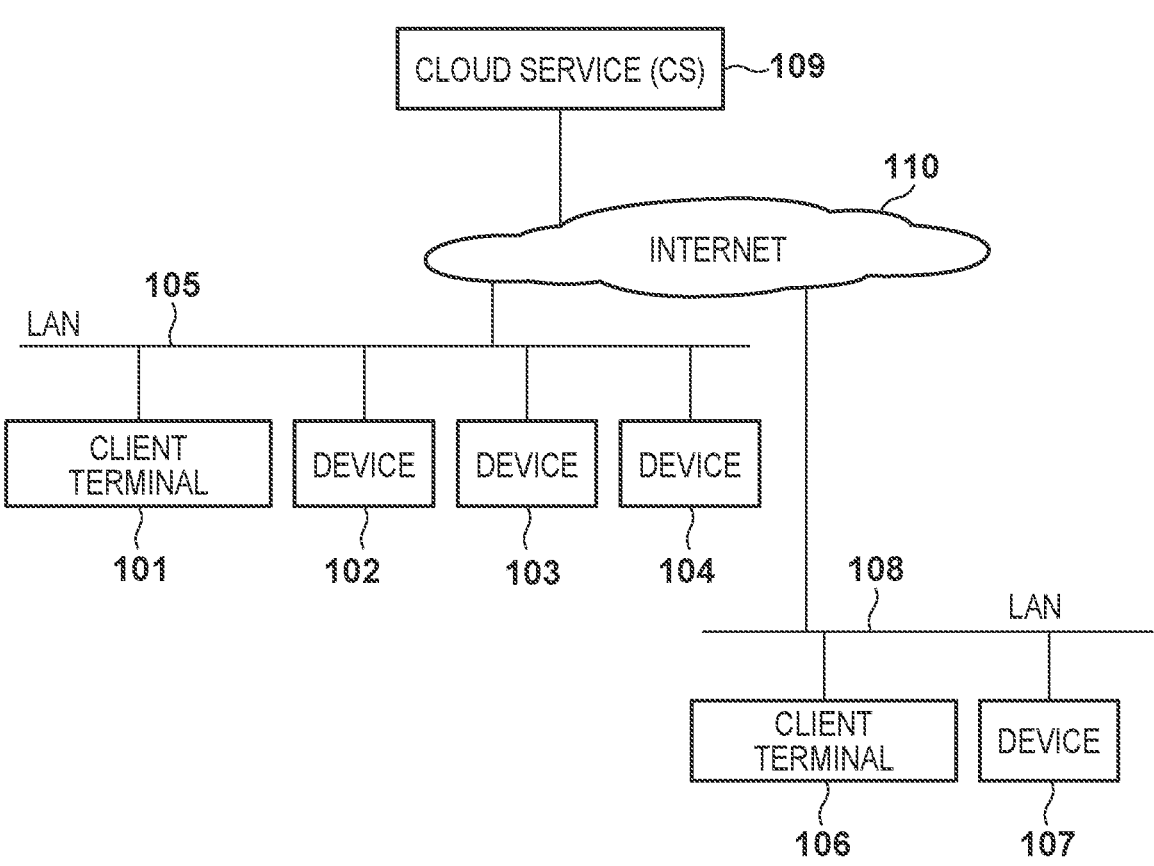

101,106,109

LAN

102~104,107

F I G. 3A
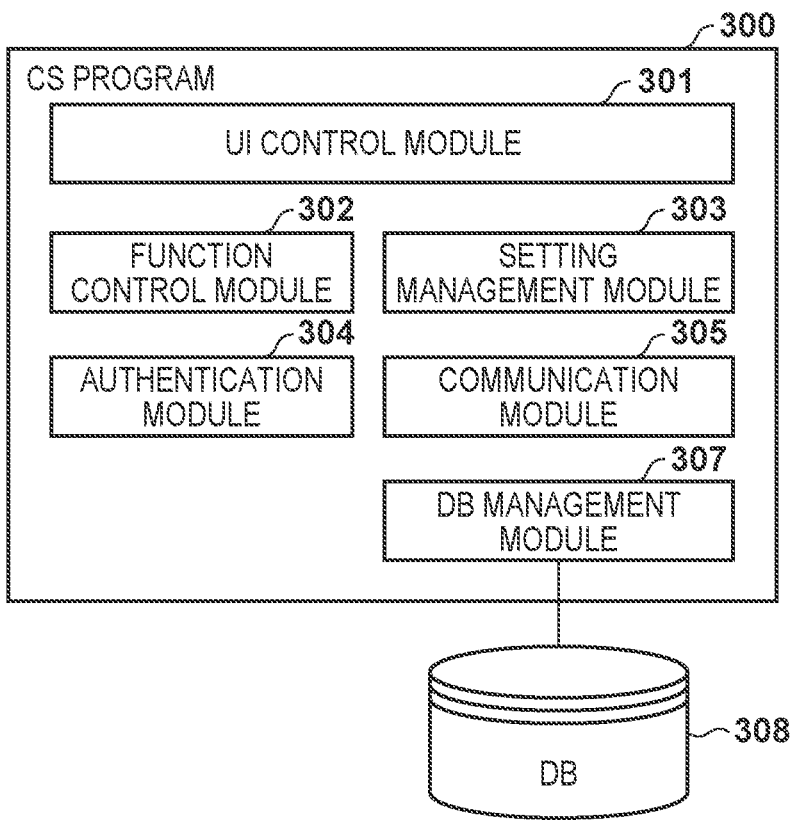
F I G. 3B
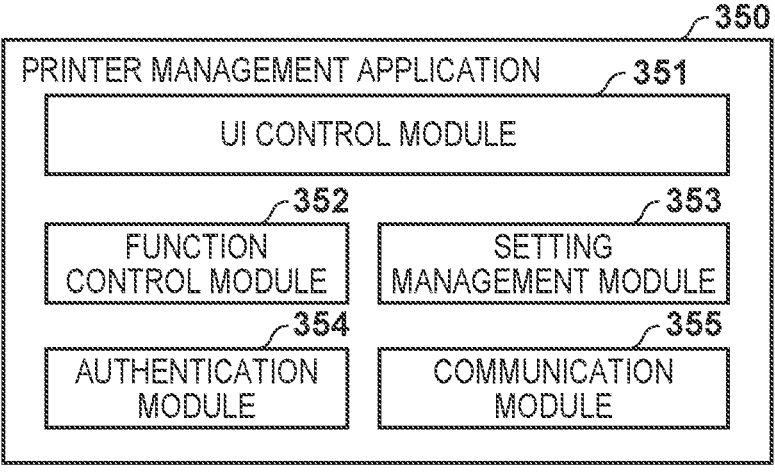

F I G. 4

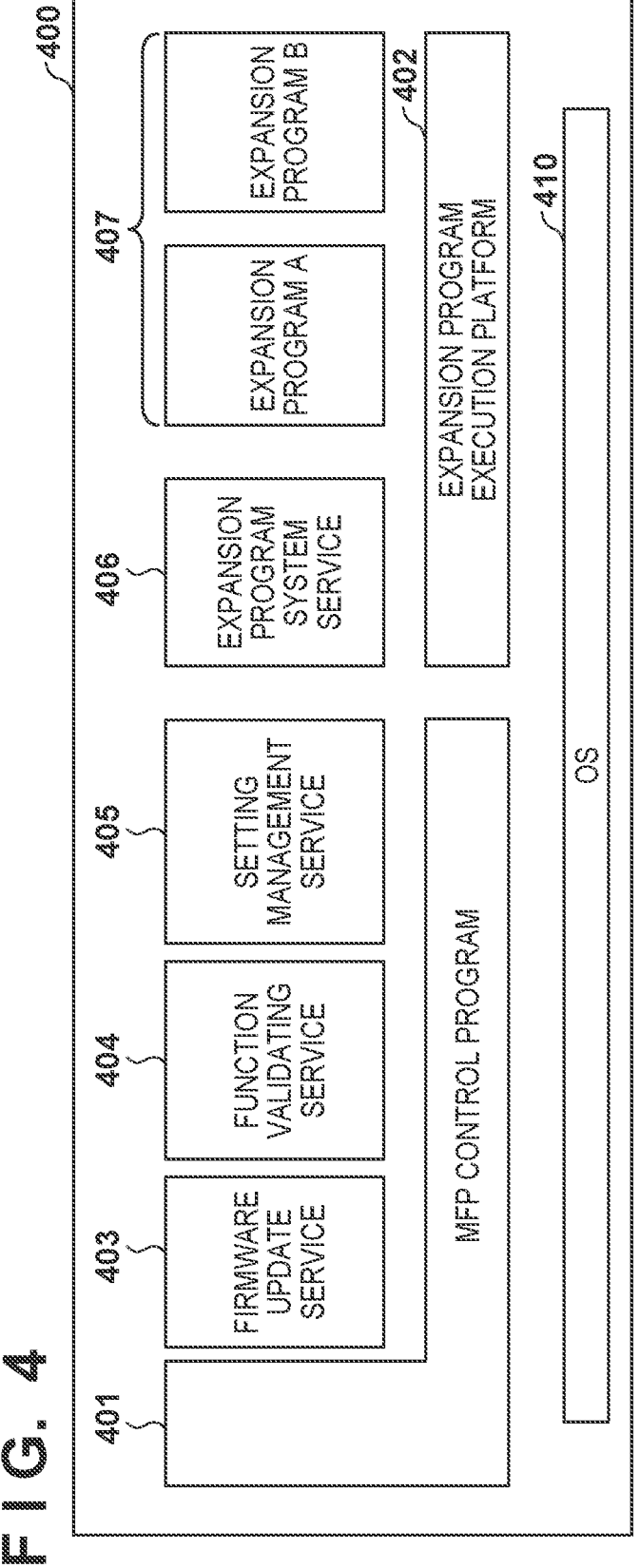

400

401 MFP CONTROL PROGRAM

403 FIRMWARE UPDATE SERVICE

404 FUNCTION VALIDATING SERVICE

405 SETTING MANAGEMENT SERVICE

406 EXPANSION PROGRAM SYSTEM SERVICE

407
EXPANSION PROGRAM A
EXPANSION PROGRAM B

402 EXPANSION PROGRAM EXECUTION PLATFORM

410 OS

F I G. 5A

510

512

| ACCOUNT 511 | BELONGING TENANT | USERNAME 513 | Role 514 | PASSWORD 515 |
|---|---|---|---|---|
| csadmin | COMMON | CS admin | CS admin | xxxx |
| user1@tenant1 | TENANT 1 | User1 | admin | xxxx |
| user2@tenant1 | TENANT 1 | User2 | general | xxxx |
| user3@tenant2 | TENANT 2 | User3 | admin | xxxx |

| ID 531 | BELONGING TENANT 532 | SETTING NAME 533 | PRIORITY SETTING INFORMATION 534 | FW VERSION 535 | FW AUTOMATIC UPDATE 536 | PW SETTING 537 | USB CONNECTION 538 | IPP PRINTING 539 | ANOTHER CS CONNECTION 540 |
|---|---|---|---|---|---|---|---|---|---|
| 0 | COMMON | SO-1 | TRUE | LATEST | ON | INITIAL VALUE PROHIBITED | OFF | ON | OFF |
| 1 | COMMON | SO-2 | FALSE | FIXED | — | INITIAL VALUE PROHIBITED | OFF | — | OFF |
| 2 | TENANT 1 | S1 | TRUE | LATEST | ON | ARBITRARY | ON | OFF | ON |
| 3 | TENANT 2 | S2 | TRUE | FIXED | OFF | — | — | OFF | — |
| 4 | ... | ... | ... | ... | ... | ... | ... | ... | ... |

| SERIAL NUMBER 551 | BELONGING TENANT 552 |
|---|---|
| SN1 1 | TENANT 1 |
| SN1 2 | TENANT 1 |
| SN2 1 | TENANT 2 |
| SN3 1 | TENANT 3 |

F I G. 6
600
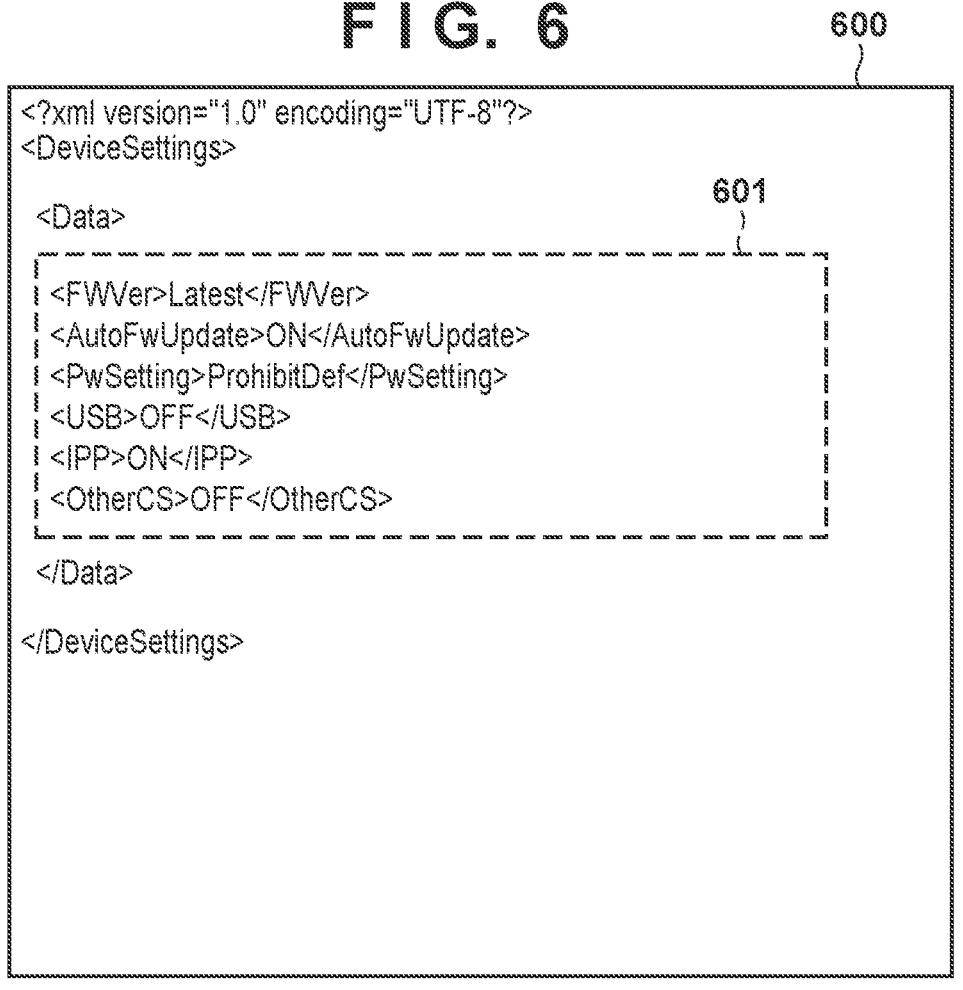
```
<?xml version="1.0" encoding="UTF-8"?>
<DeviceSettings>
 <Data>
```
601
```
  <FWVer>Latest</FWVer>
  <AutoFwUpdate>ON</AutoFwUpdate>
  <PwSetting>ProhibitDef</PwSetting>
  <USB>OFF</USB>
  <IPP>ON</IPP>
  <OtherCS>OFF</OtherCS>
```
```
 </Data>
</DeviceSettings>
```

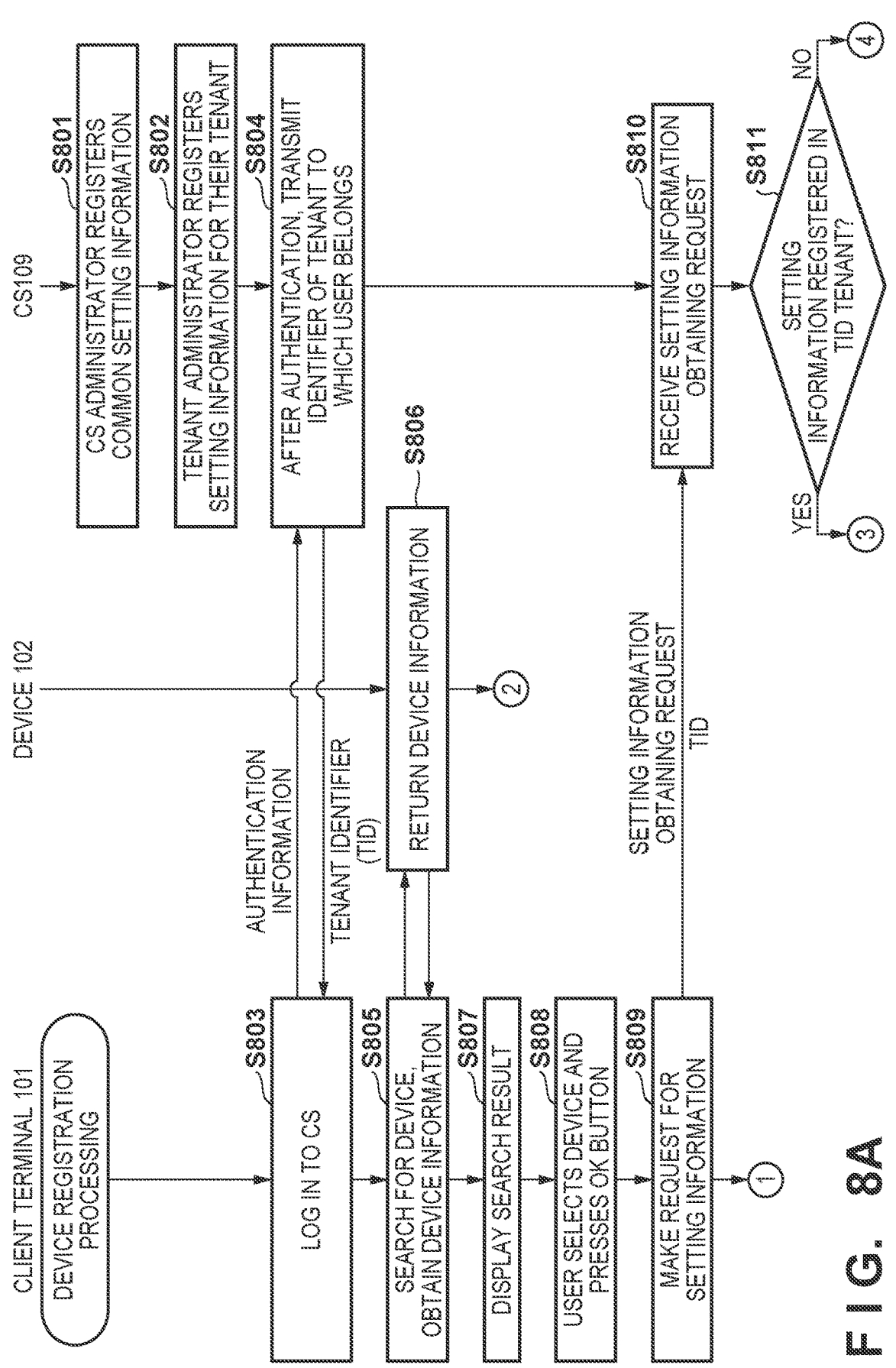
F I G. 8A

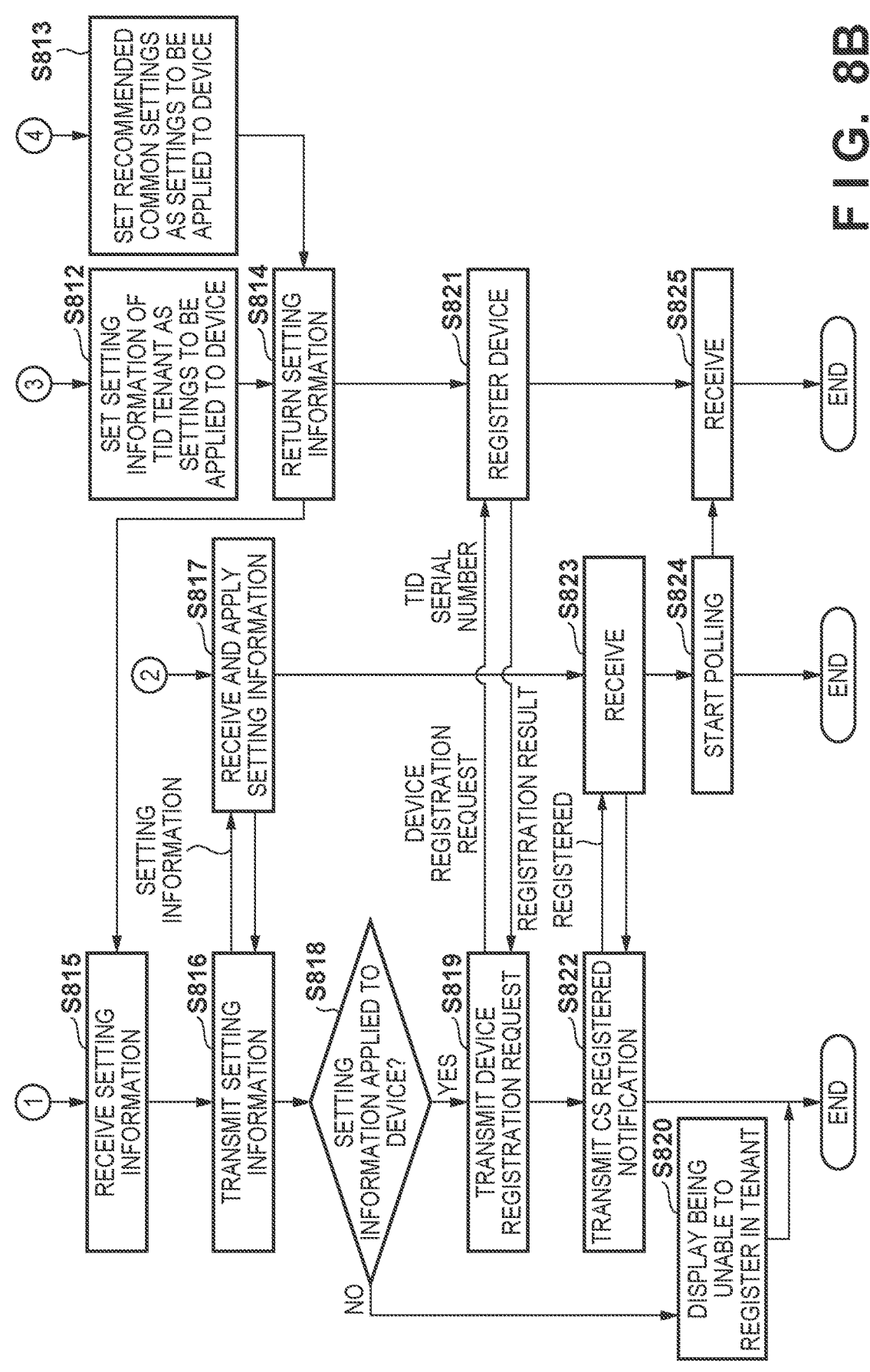
F I G. 8B

F I G. 9B
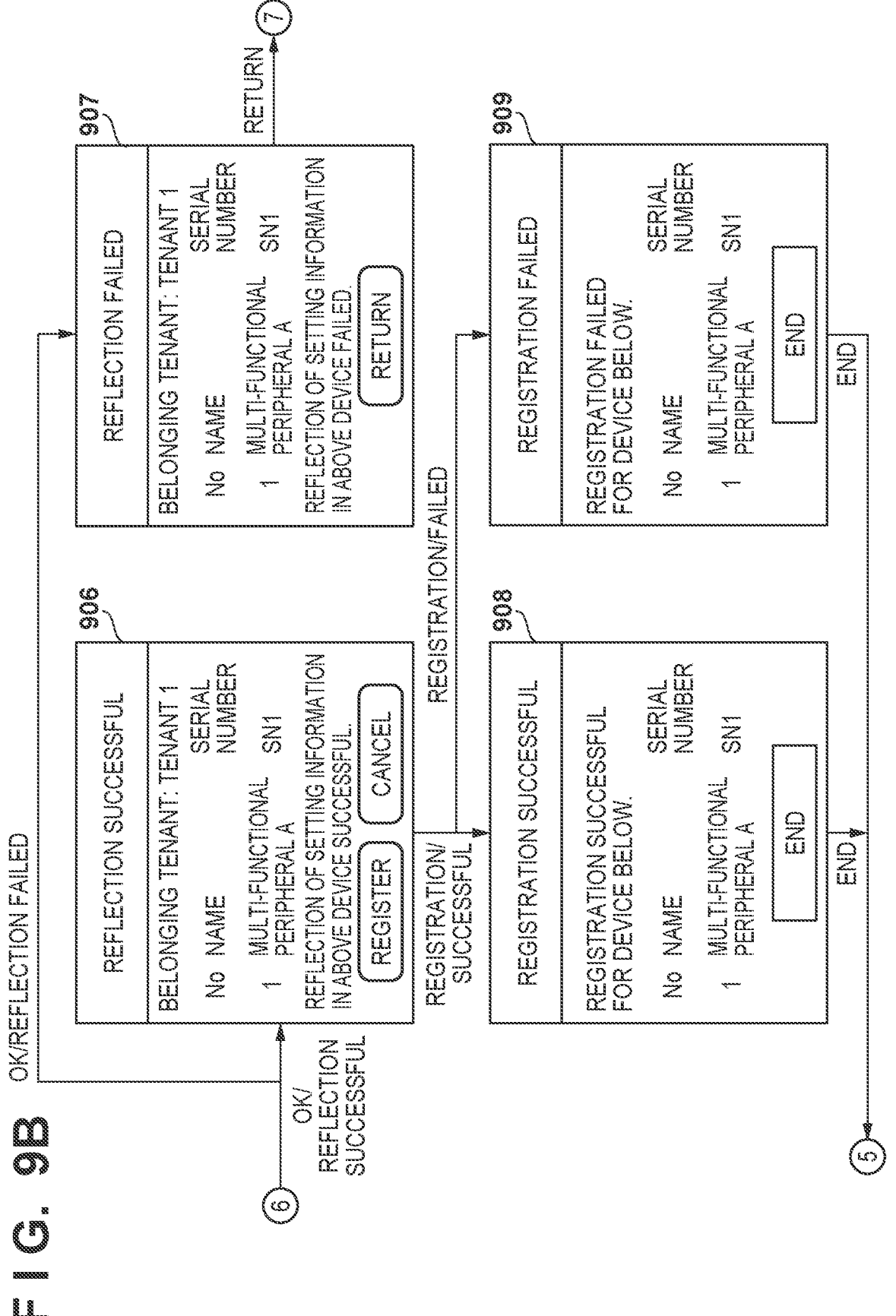

F I G. 10A
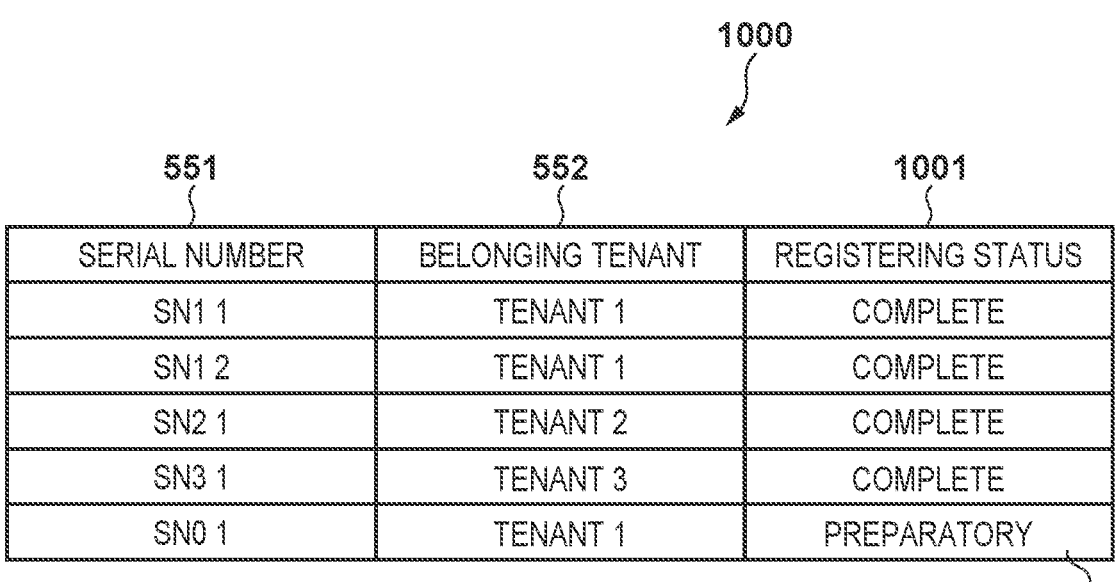
| SERIAL NUMBER | BELONGING TENANT | REGISTERING STATUS |
|---|---|---|
| SN1 1 | TENANT 1 | COMPLETE |
| SN1 2 | TENANT 1 | COMPLETE |
| SN2 1 | TENANT 2 | COMPLETE |
| SN3 1 | TENANT 3 | COMPLETE |
| SN0 1 | TENANT 1 | PREPARATORY |
F I G. 10B
REGISTER DEVICE INFORMATION
BELONGING TENANT:    TENANT 1 — 1021
SERIAL NUMBER:    SN01 — 1022
OK          CANCEL — 1024
1023

Figure 11A:
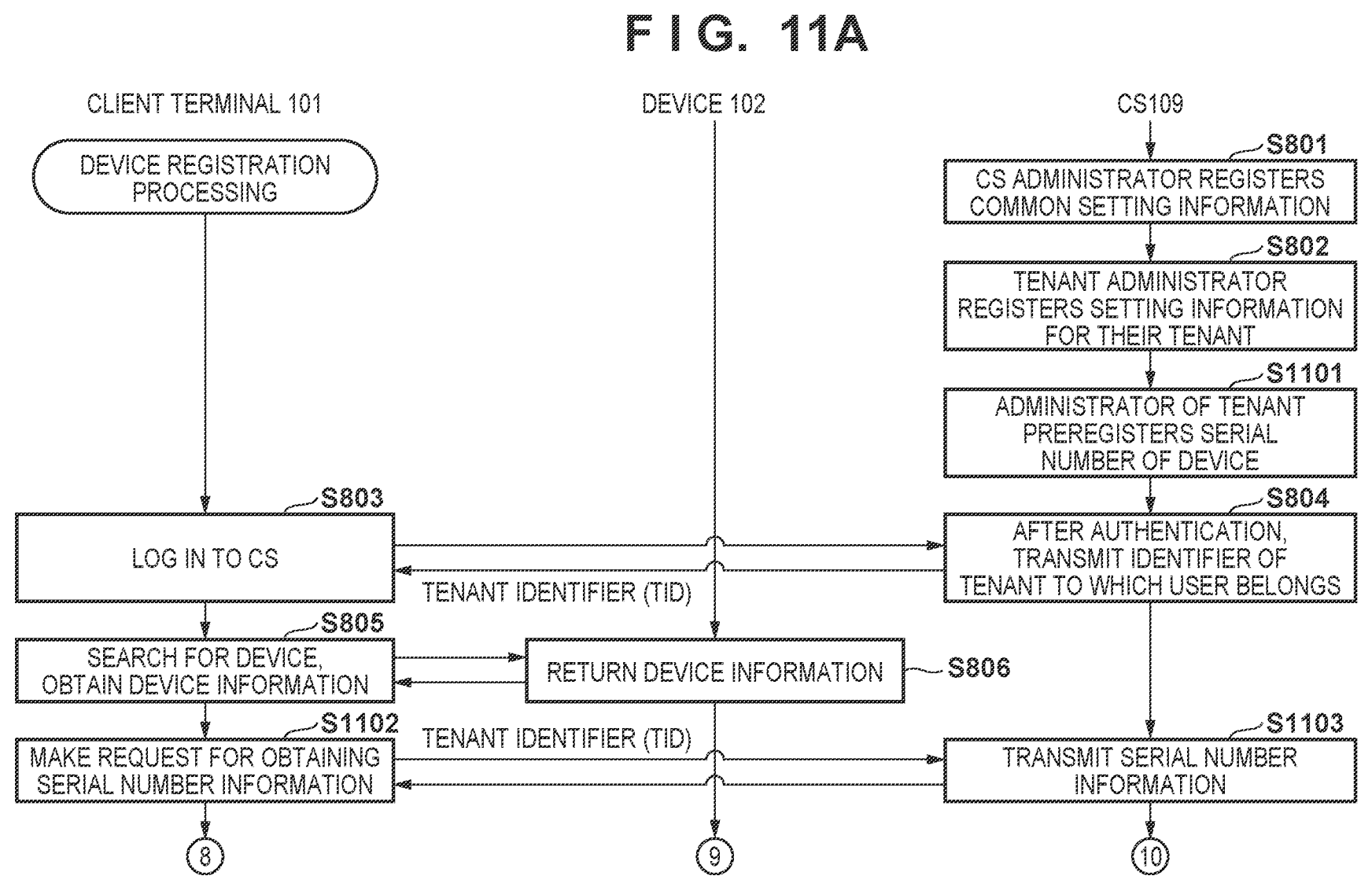

S801 — CS ADMINISTRATOR REGISTERS COMMON SETTING INFORMATION

S802 — TENANT ADMINISTRATOR REGISTERS SETTING INFORMATION FOR THEIR TENANT

S1101 — ADMINISTRATOR OF TENANT PREREGISTERS SERIAL NUMBER OF DEVICE

S804 — AFTER AUTHENTICATION, TRANSMIT IDENTIFIER OF TENANT TO WHICH USER BELONGS

S1103 — TRANSMIT SERIAL NUMBER INFORMATION

⑩

DEVICE 102

TENANT IDENTIFIER (TID)

S806 — RETURN DEVICE INFORMATION

TENANT IDENTIFIER (TID)

⑨

CLIENT TERMINAL 101

DEVICE REGISTRATION PROCESSING

S803 — LOG IN TO CS

S805 — SEARCH FOR DEVICE, OBTAIN DEVICE INFORMATION

S1102 — MAKE REQUEST FOR OBTAINING SERIAL NUMBER INFORMATION

⑧

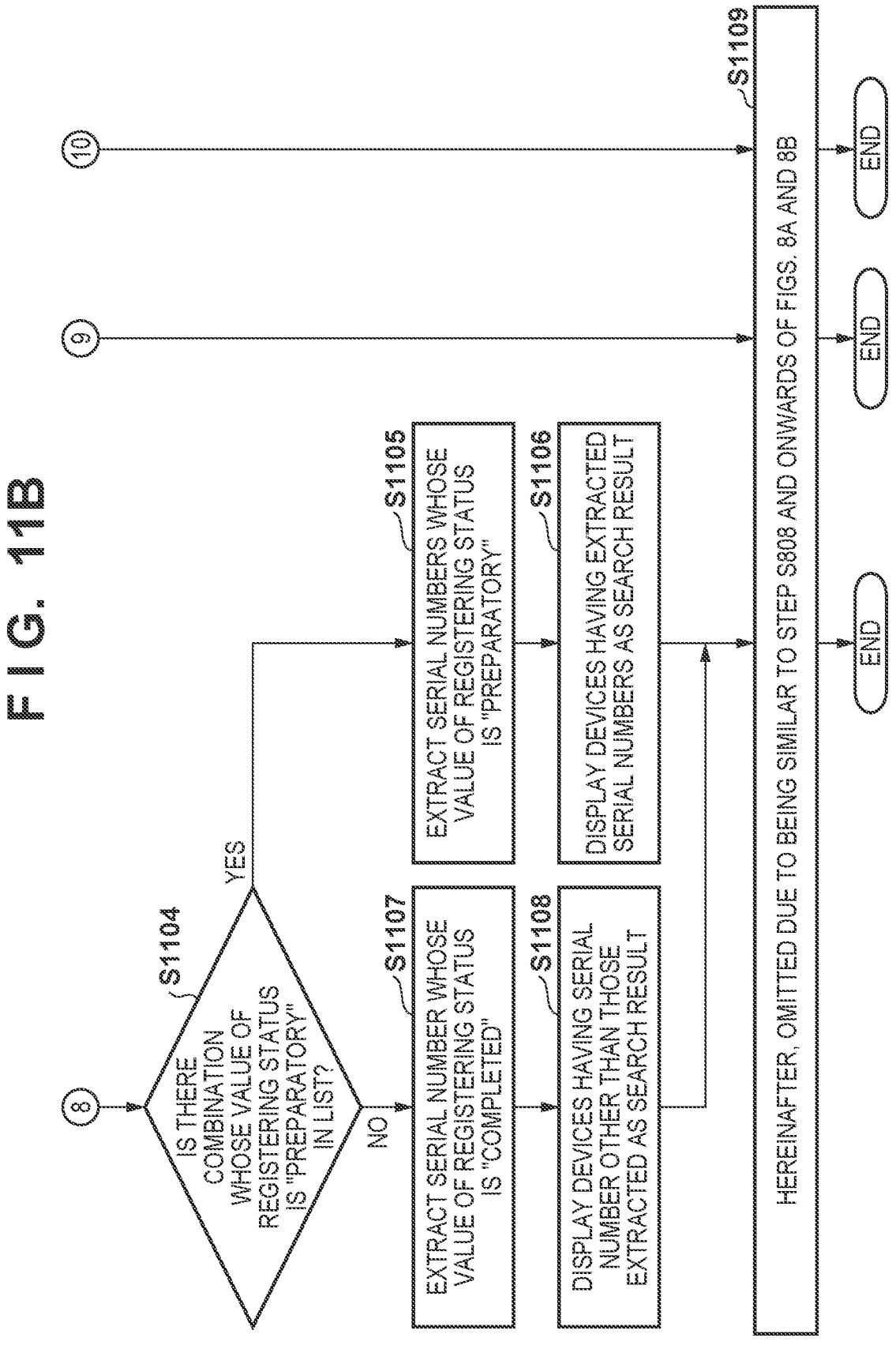
F I G. 11B

F I G. 12A
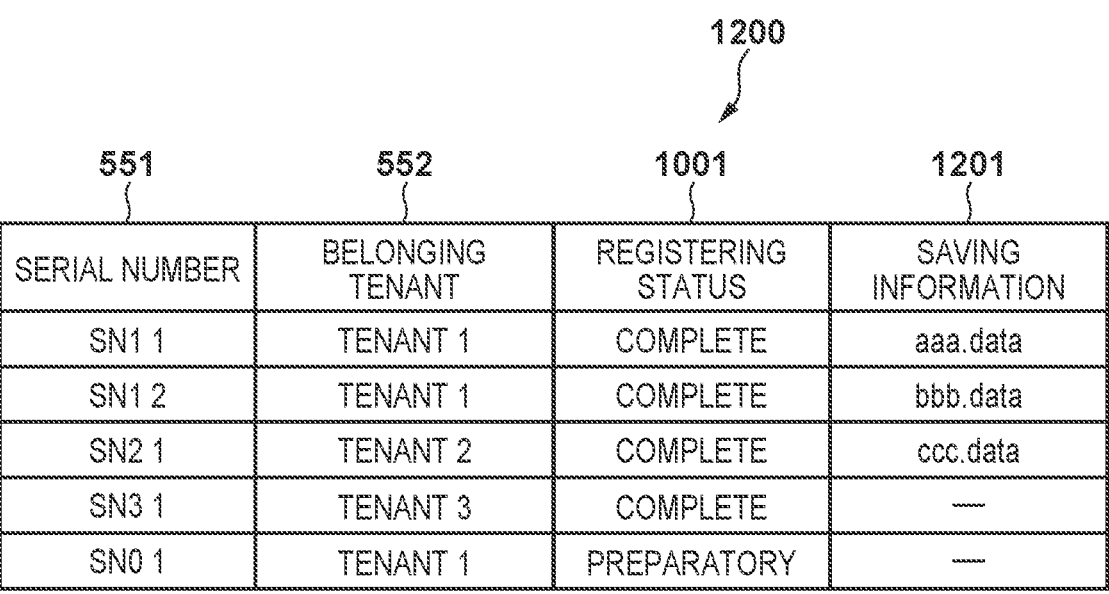
| SERIAL NUMBER | BELONGING TENANT | REGISTERING STATUS | SAVING INFORMATION |
|---|---|---|---|
| SN1 1 | TENANT 1 | COMPLETE | aaa.data |
| SN1 2 | TENANT 1 | COMPLETE | bbb.data |
| SN2 1 | TENANT 2 | COMPLETE | ccc.data |
| SN3 1 | TENANT 3 | COMPLETE | — |
| SN0 1 | TENANT 1 | PREPARATORY | — |
F I G. 12B
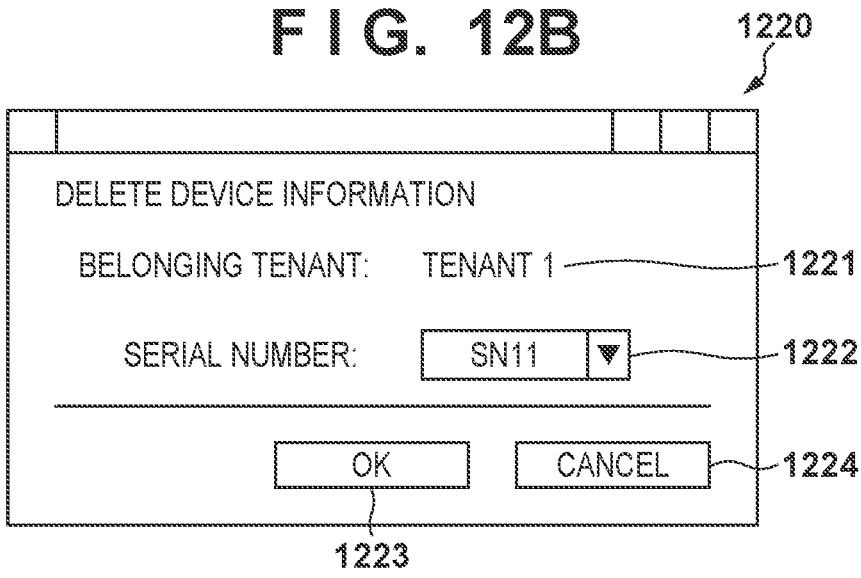
DELETE DEVICE INFORMATION
BELONGING TENANT:     TENANT 1 ———————— 1221
SERIAL NUMBER:     SN11 ▼ ———————— 1222
OK          CANCEL ———— 1224
1223

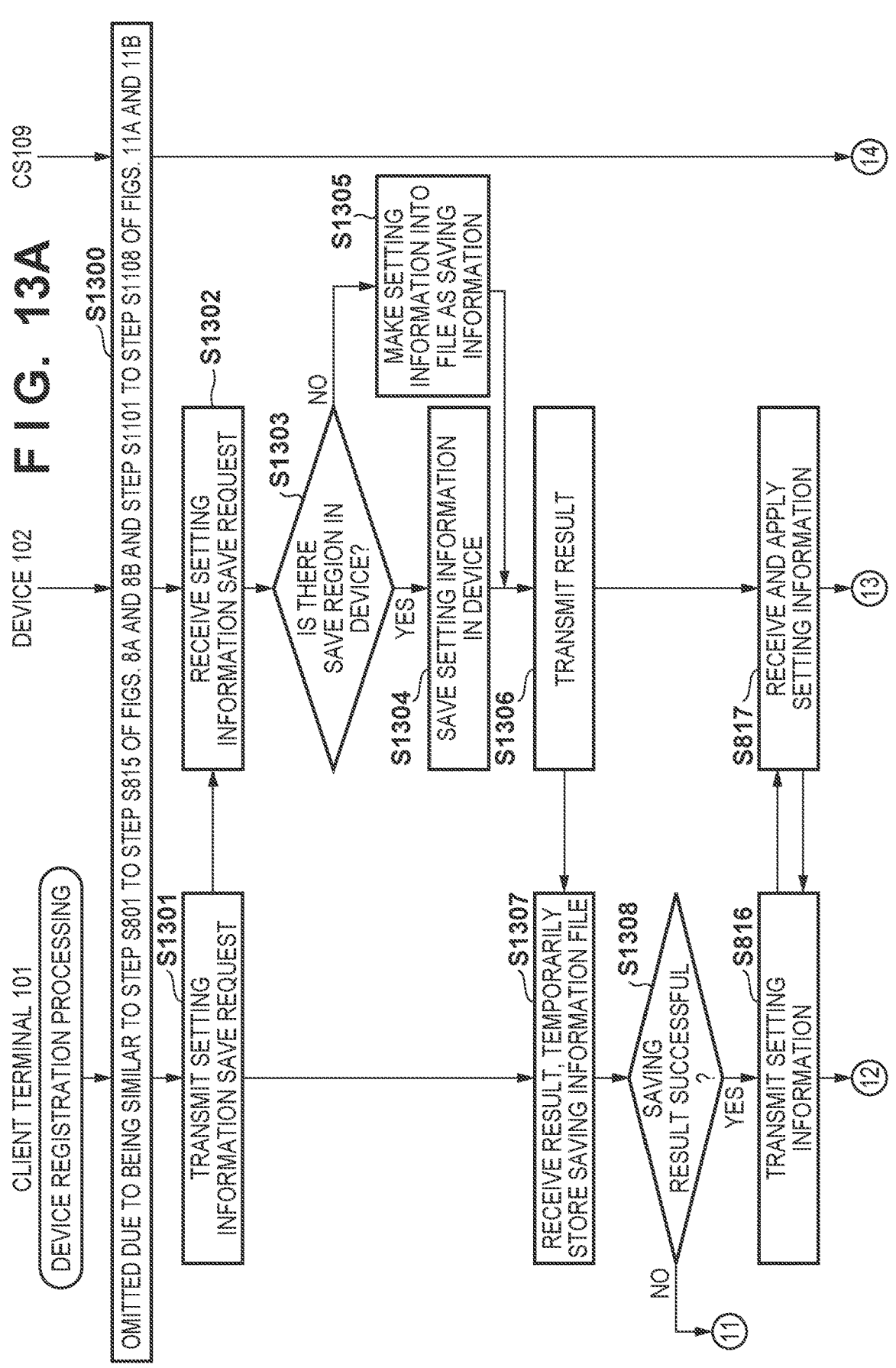
F I G. 13A

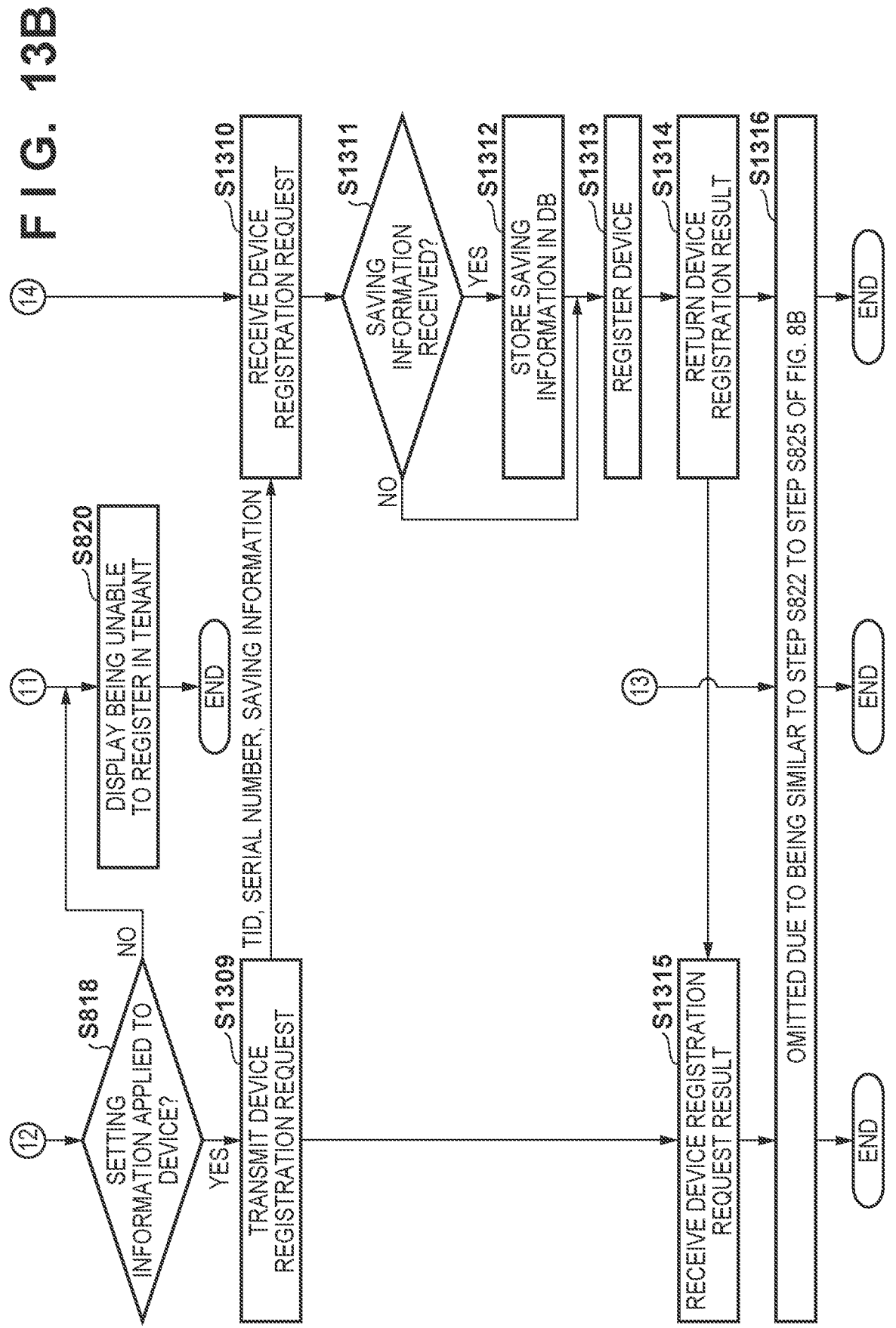
F I G.  13B

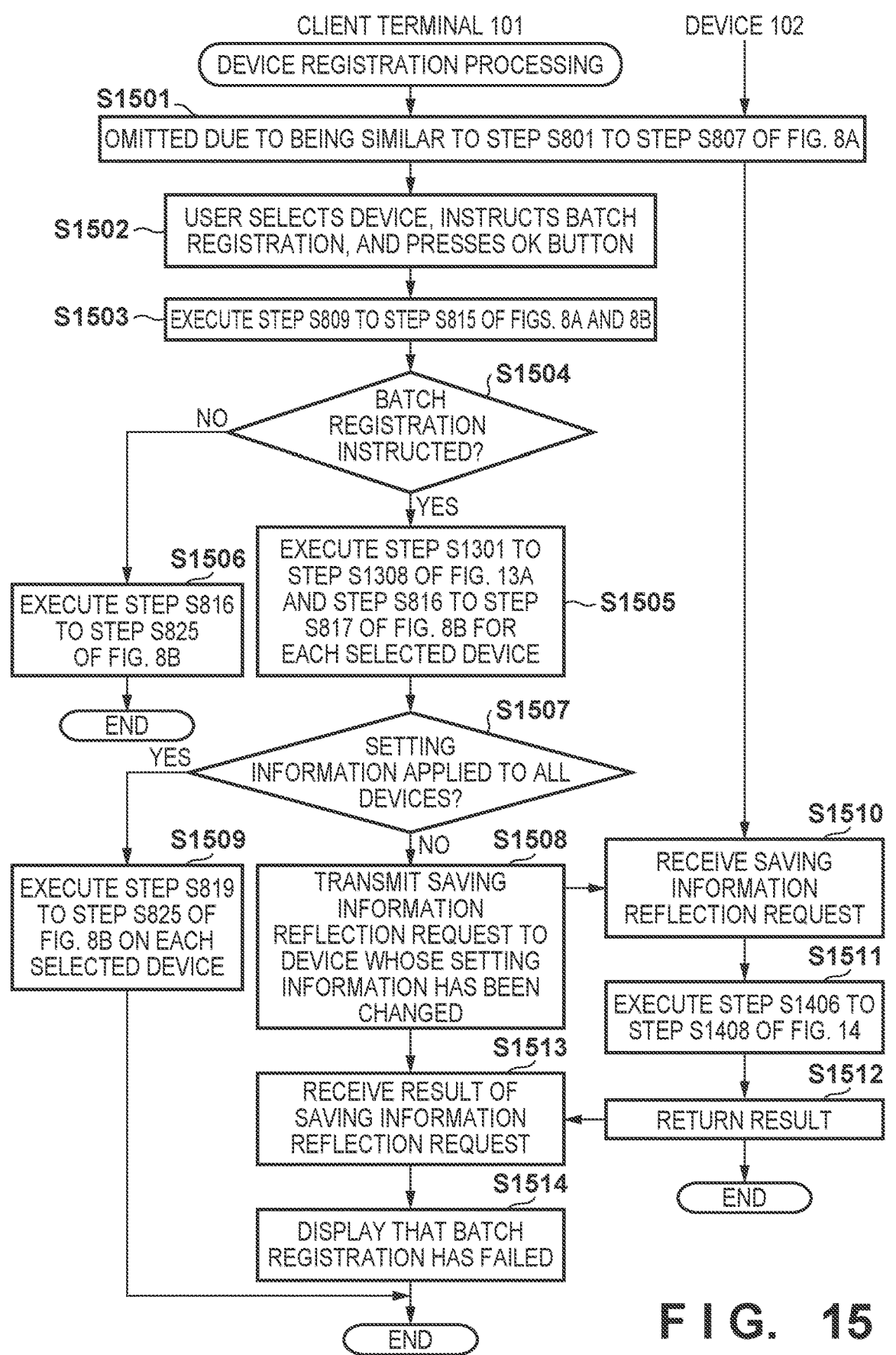
F I G.  15

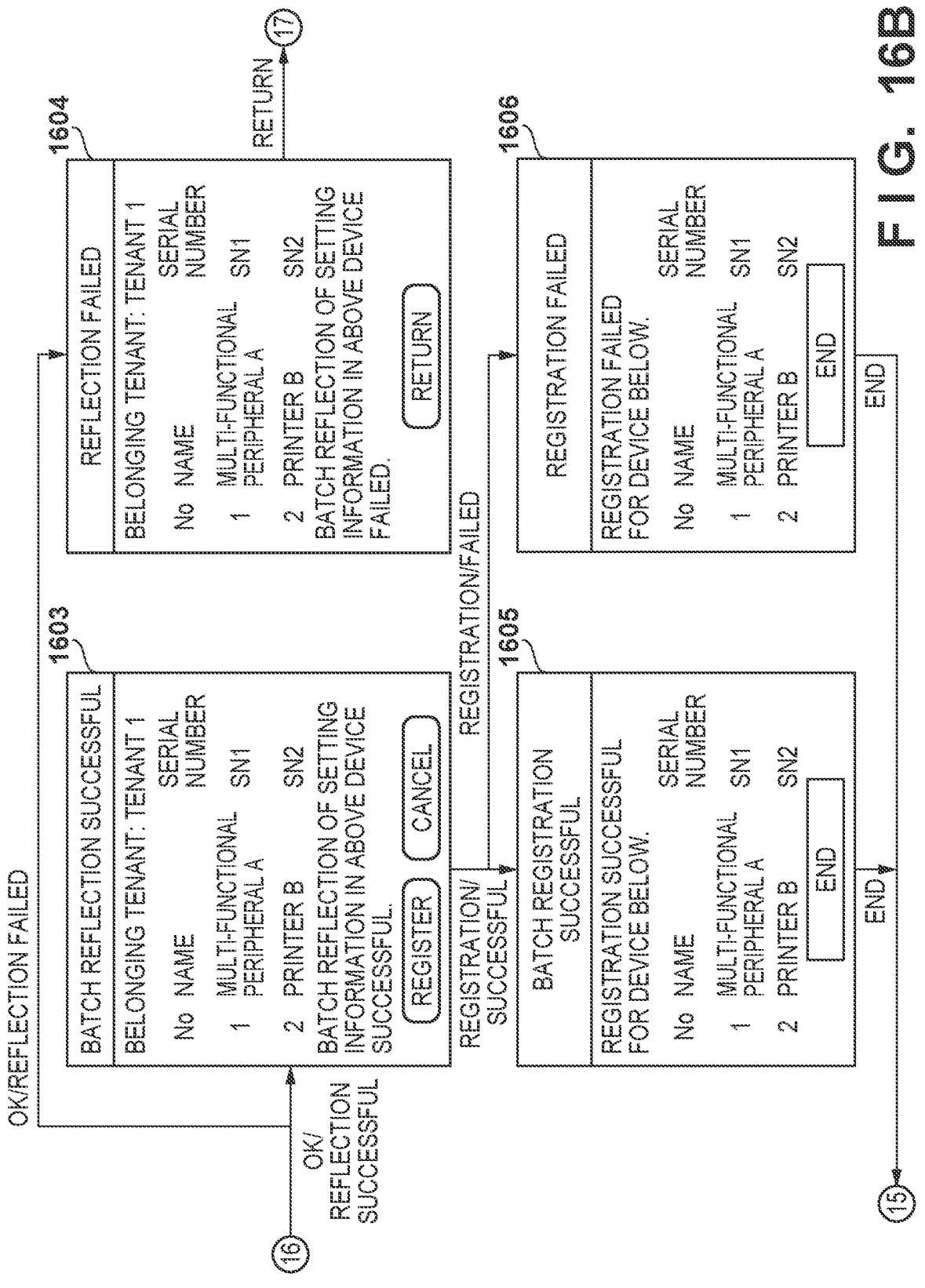
F I G.   16B

INFORMATION PROCESSING APPARATUS, METHOD OF REGISTERING DEVICE CONNECTED TO INFORMATION PROCESSING APPARATUS IN SERVER, AND STORAGE MEDIUM

BACKGROUND OF THE INVENTION

Field of the Invention

The present invention relates to an information processing apparatus, a method of registering a device connected to the information processing apparatus in a server, and a storage medium.

Description of the Related Art

In recent years, information processing systems that manage devices, as typified by multi-functional peripherals, by using cloud services (hereinafter, referred to as CS) provided on the Internet have been proposed. In such systems, an administrator of a tenant (user group unit) of a CS first registers a device in the tenant to which the administrator belongs. Then, the administrator distributes various kinds of setting information, which includes setting information related to security being operated at the tenant, to the registered device, thereby reducing a security risk of communication between the device and the CS.

Japanese Patent Laid-Open No. 2019-537381 describes a form in which one or more devices first connect to a concierge service of a CS when starting communication with the CS. The concierge service of the CS provides a communication channel according to security capabilities of the device, and the device starts communication with the CS using that communication channel. After starting the communication, the CS can distribute setting information to the device.

However, in a case of Japanese Patent Laid-Open No. 2019-537381, when a device whose security setting is inappropriate is connected to a CS, a concierge service of the CS provides a low-security communication channel accordingly. As a result, security of communication in an information processing system to which the device and the CS belong may not be ensured.

SUMMARY OF THE INVENTION

Embodiments of the present disclosure eliminate the above-mentioned issues with conventional technology.

A feature of embodiments of the present disclosure is to provide a technique for allowing a device to be in a security state required by a server before the device starts communication with the server.

According to embodiments of the present disclosure, there is provided an information processing apparatus operable to register a device in a server, the information processing apparatus comprising: a controller including one or more memories storing instructions and one or more processors configured to execute the instructions, the controller configured to: transmit, to the server, authentication information for login process on the servers; upon success of the login process, search for a device connected to the information processing apparatus; in response to an instruction for registering a found device, make a request to the server for setting information including security setting information for communication between the server and a device to be registered; transmit, to the device to be registered, the setting information obtained from the server in response to the request; determine whether the setting information has been reflected in the device to be registered; and upon determining that the setting information has been reflected, transmit, to the server, identification information of the device to be registered and make a request to the server to register the device to be registered.

According to embodiments of the present disclosure, there is provided a method of registering a device connected to an information processing apparatus in a server, the method comprising: transmitting, to the server, authentication information for login process on the servers; upon success of the login process, causing the information processing apparatus to search for a connected device; obtaining, from the server, setting information including security setting information for a found device and the server to perform communication; transmitting to the device the obtained setting information; determining whether the setting information transmitted to the device has been reflected in the device; upon determining that the setting information has been reflected in the device, making a request to the server to register the device.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 1 is a diagram illustrating a configuration of an information processing system according to a first embodiment of the present invention.

FIG. 3A is a functional block diagram for describing an example of a functional configuration of a CS program, which operates on the CS according to the first embodiment.

FIG. 3B is a functional block diagram for describing an example of a functional configuration of a printer management application, which operates on the client terminal according to the first embodiment.

FIG. 4 is a diagram for describing an example of a software configuration of a multi-functional peripheral, which is an example of the device according to the first embodiment.

FIGS. 5A to 5C are diagrams illustrating examples of tables managed by the CS according to the first embodiment.

FIG. 6 is a diagram for describing a setting information file handled in the first embodiment.

FIGS. 8A and 8B are flowcharts for explaining a process of the CS, the client terminal, and the device when registering the device in the CS according to the first embodiment.

FIGS. 9A and 9B are diagrams for describing an example of transition of UI screens of the printer management application executed in the client terminal according to the first embodiment.

FIG. 10A is a diagram illustrating an example of a serial number management table managed by the CS according to a second embodiment.

FIG. 10B is a diagram illustrating an example of a registration screen to be displayed by the CS according to the second embodiment.

FIGS. 11A and 11B are flowcharts for explaining a process of the CS, the client terminal, and the device when registering the device in the CS according to the second embodiment.

FIG. 12A is a diagram illustrating an example of a serial number management table managed by the CS according to a third embodiment.

FIG. 12B is a diagram illustrating an example of a deletion screen to be displayed by the CS according to the third embodiment.

FIGS. 13A and 13B are flowcharts for explaining a process of the CS, the client terminal, and the device when registering the device in the CS according to the third embodiment.

FIG. 15 is a flowchart for explaining a process for batch registration of devices in the CS by the client terminal and the device according to a fourth embodiment.

FIGS. 16A and 16B are diagrams for describing an example of transition of a UI screen of the printer management application executed in the client terminal according to the fourth embodiment.

DESCRIPTION OF THE EMBODIMENTS

Figure 2A:
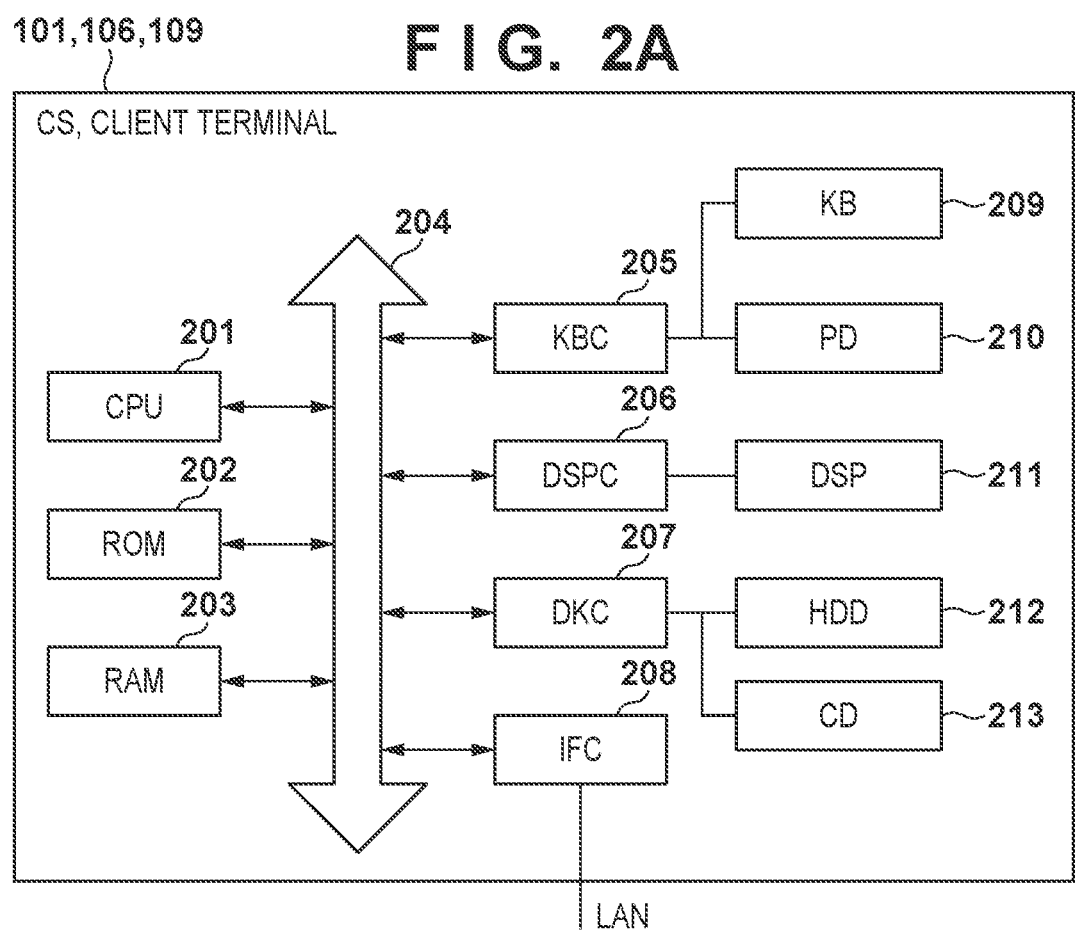
FIG. 2A is a block diagram for describing a hardware configuration of an information processing apparatus typified by a client terminal or a CS according to the first embodiment.

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

First Embodiment

FIG. 1 is a diagram illustrating a configuration of an information processing system according to a first embodiment of the present invention.

The information processing system includes a cloud service (CS) 109 and client terminals 101 and 106 and devices 102, 103, 104, and 107, which are connected via the Internet 110. In the first embodiment, a PC or a mobile terminal is assumed as an example of the client terminals 101 and 106; however, the present invention is not limited thereto. A multi-functional peripheral (MFP) that includes a print function, a scan function, a network communication function, and the like is assumed as an example of the devices 102 to 104 and 107; however, the present invention is not limited thereto. The device may be, for example, a single-function printer that only has a print function. Here, the client terminal 101 and the devices 102 to 104 are connected to a LAN 105, and the client terminal 106 and the device 107 are connected to a LAN 108. The CS 109 includes a cloud server and executes a process for registering the devices 102 to 104 and 107 in the CS 109 and manages various kinds of information held in the devices in cooperation with the client terminals 101 and 106. The devices connected to their respective LANs 105 and 108 are connected with the CS 109 via the Internet 110.

Data (various kinds of device information and setting information) that the CS 109 has exchanged with the client terminals and the devices is stored in a dedicated storage region for each tenant. The data stored for each tenant can only be referenced by a user or a device that has a privilege to access the tenant. For example, assume that the client terminal 101 and the devices 102 to 104 belong to a tenant 1 and the client terminal 106 and device 107 belong to a tenant 2 on the CS 109. In such a case, the client terminal 101 and the devices 102 to 104 cannot access data of the tenant 2. Similarly, the client terminal 106 and the device 107 cannot access data of the tenant 1.

FIG. 2A is a block diagram for describing a hardware configuration of an information processing apparatus typified by the client terminal or a server of the CS 109 according to the first embodiment.

A program (e.g., a CS program in the CS 109) according to the present embodiment that is an agent of operation in all of the later-described descriptions is stored in a hard disk (HDD) 212. In all of the later-described descriptions, a CPU 201 is an agent of execution on hardware unless otherwise specified. Meanwhile, an agent of control on software is a program stored in the hard disk (HDD) 212. A ROM 202 stores BIOS, a boot program, and the like. A RAM 203 functions as a main memory, a work area, and the like of the CPU 201. A KBC 205 is a keyboard controller (KBC) and controls input of instructions from a keyboard (KB) 209, a pointing device (PD) 210, and the like. A display controller (DSPC) 206 controls display of a display (DSP) 211. A disk controller (DKC) 207 controls access to storage apparatuses, such as the hard disk (HDD) 212 and a CD-ROM (CD) 213. Programs, other data, and the like, such as the boot program, an operating system, a database, and the CS program, are stored in the hard disk (HDD) 212, the CD-ROM (CD) 213, and the like. An interface controller (IFC) 208 transmits and receives information to and from another network device via a LAN. Each of these components is connected to a system bus 204.

The program according to the present embodiment may be provided in a form in which it is stored in a storage medium, such as a CD-ROM. In such a case, the program is read out from the CD 213 by the DKC 207 illustrated in FIG. 2A and then installed in the hard disk (HDD) 212.

Figure 2B:
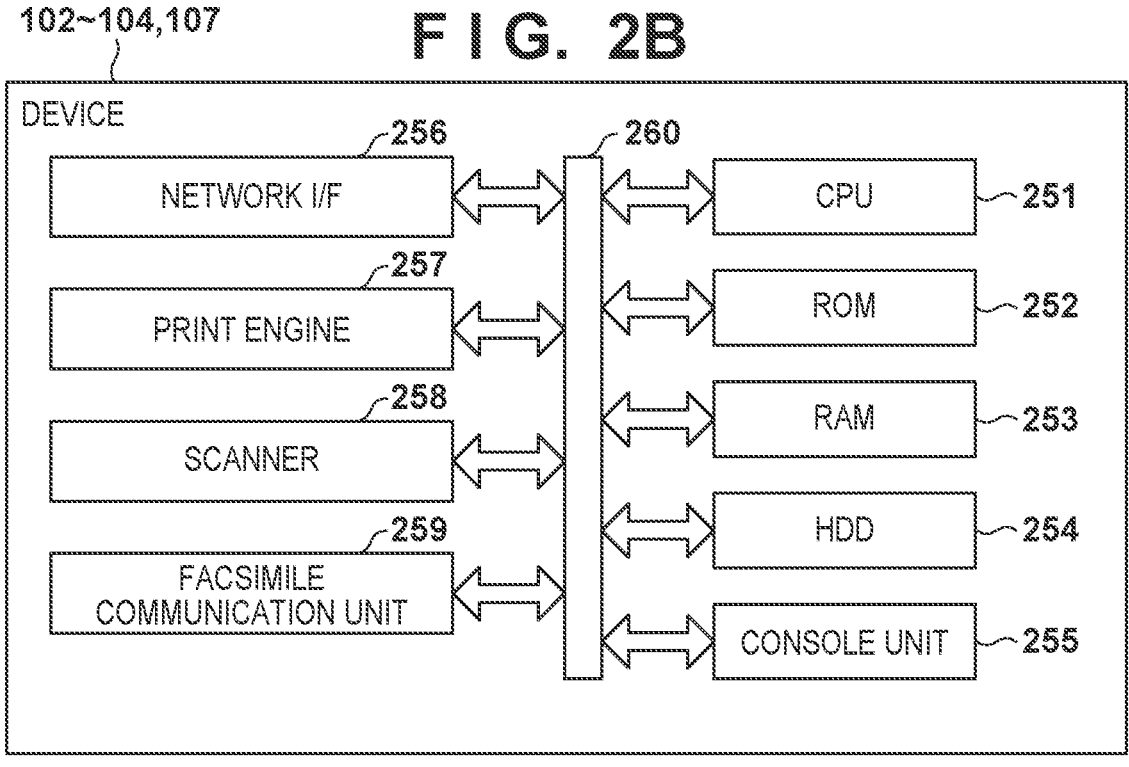
FIG. 2B is a block diagram for describing an internal configuration of a multi-functional peripheral, which is an example of a device according to the first embodiment.

FIG. 2B is a block diagram for describing an internal configuration of a multi-functional peripheral, which is an example of the device 102 according to the first embodiment.

A CPU 251 administers control of the entire multi-functional peripheral. A ROM 252 stores, for example, a serial number of the multi-functional peripheral. A RAM 253 is used as a work area of the CPU 251 and a receive buffer and for image rendering. An HDD 254 is a hard disk (HDD) for storing firmware, expansion programs, font data, and the like. A console unit 255 includes various switches and buttons as well as, for example, a display unit for displaying a message. A network interface 256 is a network interface for connecting to a network and transmits and receives information to and from another network device via a LAN. A print engine 257 performs printing on a printing sheet. A scanner 258 reads an original. A facsimile communication unit 259 transmits and receives a facsimile. Each of these components is connected to a system bus 260.

FIG. 3A is a functional block diagram for describing an example of a functional configuration of a CS program 300, which operates on the CS 109 according to the first embodiment. Each function of the CS 109 is realized by the CPU 201 executing the program.

A user interface (UI) control module 301 provides a graphical user interface for the user to operate the program. The graphical user interface is configured as a web page that can be displayed by another client terminal by using Hyper-Text Transfer Protocol (HTTP). Alternatively, the graphical user interface may be configured to be displayed on the display 211 provided in the CS 109. A function control module 302 instructs respective processes to the respective functions in the CS program 300 according to an instruction of the UI control module 301 or a request received by the communication module 305. A setting management module 303 stores and controls various kinds of setting information related to the CS program 300 and information of a device registered in the CS 109 in a database (DB) 308. An authentication module 304 performs a process for authenticating a user who has made a login request to the CS 109 by utilizing user information for each tenant stored in the DB 308. The communication module 305 receives a request from the client terminal 101, the device 102, or the like and transmits contents of the request to the function control module 302. Furthermore, the communication module 305 receives a result of a process for the request from the function control module 302, creates response data for the request, and transmits a response to a source of transmission of the request. In addition, the communication module 305 controls HTTP communication and transmits a web page received from the UI control module 301 to the client terminal as necessary. According to an instruction of the function control module 302, a DB management module 307 instructs the DB 308 to perform various settings and a process for storing, deleting, updating, and obtaining user information and the like. In addition, the DB management module 307 manages various tables to be used by the CS program 300. The DB 308 is a database that holds various kinds of data and various tables. The data held in the DB 308 is managed for each tenant. A user can only access data of a tenant to which the user belong and is restricted from accessing data of another tenant.

FIG. 3B is a functional block diagram for describing an example of a functional configuration of a printer management application 350, which operates on the client terminal 101 according to the first embodiment.

Since functions of a UI control module 351 and a function control module 352 are similar to those of the UI control module 301 and the function control module 302 of FIG. 3A, descriptions thereof will be omitted. A setting management module 353 manages various kinds of setting information related to the printer management application 350 and temporarily holds the setting information in association with a serial number of a device. An authentication module 354 performs an authentication process for logging in to the CS 109 by using account information inputted by the user. A communication module 355 receives a request or a response from the CS 109, the device 102, or the like and transmits contents of the request or contents of the response to the function control module 352. Furthermore, the communication module 355 receives a processing result of the request or the response from the function control module 352 and, for the request, creates response data and transmits the response data to a source of transmission of the request. In addition, the communication module 355 controls HTTP communication and transmits a web page received from the UI control module 351 to the client terminal as necessary.

FIG. 4 is a diagram for describing an example of a software configuration of a multi-functional peripheral, which is an example of the device according to the first embodiment.

In multi-functional peripheral software 400 of a multi-functional peripheral, an MFP control program 401, which is a control program of a printer, a FAX, a scanner, and the like that is native, is operating on an OS 410. An expansion program execution platform 402, which is an expansion program execution platform, is also operating on the OS 410. Furthermore, a firmware update service 403, a function validating service 404, and a setting management service 405 are operating on the MFP control program 401. In addition, an expansion program system service 406 and an expansion program 407 are operating on the expansion program execution platform 402.

The firmware update service 403 is a service that provides various functions for updating firmware. For example, the firmware update service 403 references firmware designated by the user and determines whether firmware of the multi-functional peripheral needs to be updated. In addition, the firmware is updated via the MFP control program 401.

The function validating service 404 is a service for validating a function that is embedded in advance in the MFP control program 401. The function validating service 404 identifies and validates functions identified by a function license file designated by the user. The setting management service 405 is a service for managing various kinds of setting information of a printer, a scanner, and the like. The setting management service 405 has a UI, and the user can instruct a setting change via the console unit 255 (FIG. 2B) of the multi-functional peripheral. The setting management service 405 also provides a function for rewriting setting information of the MFP control program 401 when a setting information file is designated by the user. The setting information file also includes security settings.

The expansion program system service 406 is a utility library that is commonly useful for expansion programs and is provided by the system. The burden of developing an expansion program can be eliminated by calling a function of the expansion program system service 406 from the expansion program 407. The expansion program 407 includes expansion programs A and B in FIG. 4 and can access the respective modules of the multi-functional peripheral, such as another expansion program 407, only via the expansion program execution platform 402 or the expansion program system service 406. In addition, the expansion program 407 that has a UI can display an icon on a main menu screen displayed on the console unit 255 of the multi-functional peripheral. Upon the user selecting the icon on the main menu screen, the console unit 255 transmits something to that effect to the CPU 251 of the device. Then, the CPU 251 displays a UI of the expansion program selected by the user on the console unit 255.

The software configuration of FIG. 4 is intended to describe only the basic portion and may include other services and the like depending on the execution environment. In addition, for reasons such as limiting settings, unnecessary services need not be available.

FIGS. 5A to 5C are diagrams illustrating examples of tables managed by the CS 109 according to the first embodiment. Configurations of the tables of FIGS. 5A to 5C are one example and may be table configurations that are different from the present example.

FIG. 5A depicts a view illustrating an example of an authentication information management table 510 that includes columns from an account 511 to a password 515, and one row of record represents one piece of authentication information. The account 511 is an ID that uniquely identifies the user that accesses the CS 109. The belonging tenant 512 is a tenant to which the user of the account 511 belongs. The username 513 is the name of the user identified by the account 511. The role 514 is a role assigned to the account 511. Here, in the first embodiment, "admin", which represents having administrator authority within the tenant, and "general", which represents a typical user, are described examples of roles; however, the present invention it is not limited thereto. Each tenant needs to have at least one account having an "admin" role belonging to it. The password 515 is a password that is inputted when the user having the account 511 logs in to the CS 109.

Authentication information of a first row of record in the authentication information management table 510 of FIG. 5A indicates an account of an administrator of the entire CS 109. This can be determined by that a value of the belonging tenant 512 is "common" (common within the server) and that a special role (in the embodiment, a "CS admin" indicating an administrator of the entire CS) is stored in the role 514.

FIG. 5B depicts a view illustrating an example of a setting information management table 530 that includes columns from an ID 531 to another CS connection 540. One row of record represents one piece of setting information. In the first embodiment, it is assumed that the setting information mainly constitutes of security settings; however, the present invention it is not limited thereto.

The identification information (ID) 531 is an ID that uniquely identifies setting information. In the first embodiment, a number that starts from 0 is stored; however, the present invention is not limited thereto. The belonging tenant 532 is a value of a tenant to which the respective setting information belongs. The setting name 533 is a name of the setting information. Regarding the priority setting 534, when there are a plurality of records whose values of the belonging tenant 532 are the same, "TRUE" is designated to the setting information to be prioritized in the belonging tenant. TRUE is designated to only one piece of setting information for each tenant. In the example of FIG. 5B, it can be seen that there are a plurality of records whose value of the belonging tenant 532 is "common" and that the setting information to be prioritized in the belonging tenant is a setting name "S0-1". "TRUE" is designated as a value of the priority setting 534 for a record also when there are no other records with the same value for the belonging tenant 532.

Security setting items, in particular, are listed as examples of setting information from the FW version 535 to another CS connection 540. The setting information is not limited to those illustrated herein. In some instances, values of the FW version 535 to another CS connection 540 are blank in the respective records. This indicates that the setting information for that record does not have those setting items.

In addition, in the example of the setting information management table 530 in FIG. 5B, the values of the belonging tenant 532 of the first row and the second row of record (the setting information whose values of the ID 531 are "0" and "1") are "common". This represents that these pieces of setting information do not belong to a particular tenant and can be referenced by all tenants as setting information (hereinafter, referred to as common setting information) common within the CS 109.

Here, the individual setting items are respectively assigned to the columns from the FW version 535 onwards of the setting information management table 530; however, a configuration may be taken so as to store an actual setting information file created in a format as illustrated in FIG. 6, which will be described later. In addition, instead of the actual file being stored, a path to the actual file may be stored. In this case, a configuration is taken so as to place the actual file as a file in a separate location.

FIG. 5C depicts a view illustrating an example of a serial number management table 550 that includes a serial number 551 and a belonging tenant 552.

The serial number 551 is a serial number of the device registered in the CS 109. The belonging tenant 552 is a value of a tenant to which the device that has the serial number stored in the serial number 551 belongs.

Although not described in the first embodiment, it is possible to include, for example, a device ID for uniquely identifying a name and model of the device or network information, such as an IP address, in the serial number management table 550 of FIG. 5C.

FIG. 6 is a diagram illustrating a setting information file handled in the first embodiment. In FIG. 6, a setting information file 600 indicates an example of a setting information file in an XML format.

A setting information region 601 lists setting information to be set for the device. In the first embodiment, tags that represent respective setting items described in the FW version 535 to another CS connection 540 of setting information ID=0 of the setting information management table 530 and their values are listed.

In the first embodiment, the setting information file is expressed in an Extensible Markup Language (XML) format; however, for example, it may be expressed in a JavaScript Object Notation (JSON) format or the like.

Figure 7A:
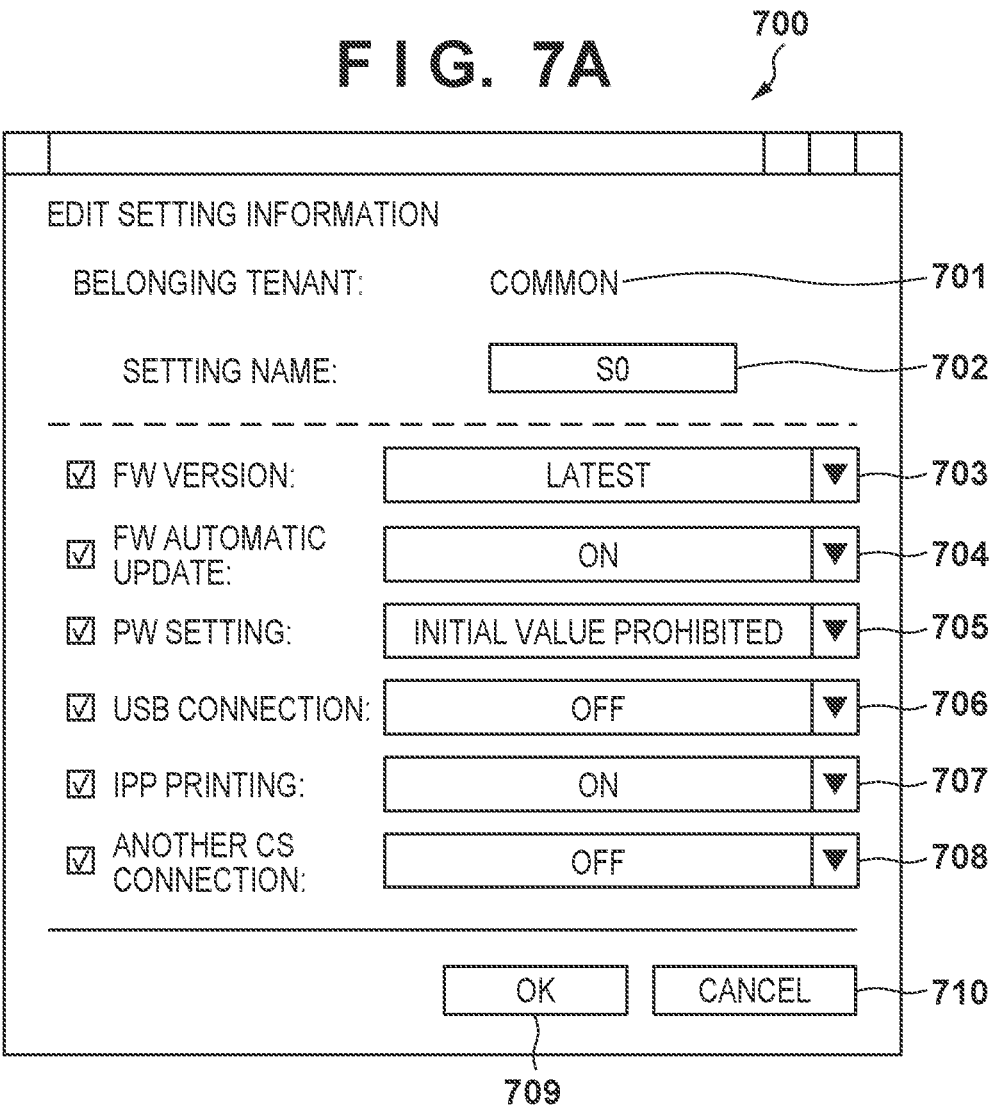
FIGS. 7A and 7B are diagrams illustrating examples of UI screens to be displayed by a UI control module of the CS program according to the first embodiment.
Figure 7B:
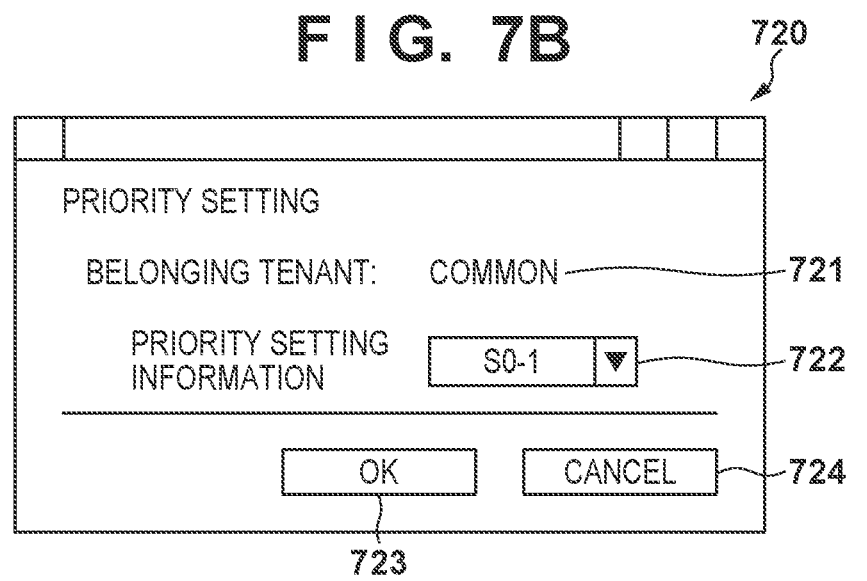

FIGS. 7A and 7B are diagrams illustrating examples of UI screens to be displayed by the UI control module 301 of the CS program 300 according to the first embodiment.

FIG. 7A depicts a view illustrating an example of an editing screen 700, and an administrator of the CS 109 or an administrator of each tenant of the CS 109 uses this screen to create setting information to be applied to a device connected to the CS 109.

In the editing screen 700, reference numeral 701 indicates a belonging tenant. The UI control module 301 obtains, for example, a belonging tenant name associated with an account used when the client terminal 101 logged in to the CS 109 from the belonging tenant 512 of the authentication information management table 510 and displays it in the belonging tenant 701. In FIG. 7A, "common" is displayed. Reference numeral 702 is a region for inputting a setting name of setting information. The UI control module 301 obtains a name of setting information to be edited from the setting name 533 of the setting information management table 530 and displays it as an initial value.

The editing screen 700 further includes regions for inputting a firmware (FW) version 703, an FW automatic update 704, a password (PW) setting 705, a USB connection 706, IPP printing 707, and another CS connection 708. These correspond to the FW version 535 another CS connection 540, respectively, of the setting information management table 530. A checkbox is added at the beginning of each setting item, and the user can select a setting item that the user wants to add to setting information by checking the checkbox. When an OK button 709 is pressed, the CS program 300 stores an editing result of the editing screen 700 in the setting information management table 530 and terminates the editing screen 700. If the user inputs a new setting name to the setting name 702 and when the OK button 709 is pressed, the DB management module 307 adds a new record to the setting information management table 530 and stores various kinds of information in the record. When a cancel button 710 is pressed, the CS program 300 discards the editing result of the editing screen 700 and ends the editing screen 700.

FIG. 7B depicts a view illustrating an example of a priority setting screen 720.

The administrator of the CS 109 or the administrator of each tenant of the CS 109 uses the priority setting screen 720 to designate setting information to be commonly prioritized or prioritized by the tenant to which the administrator belongs. In the priority setting screen 720, reference numeral 721 indicates a belonging tenant. Since a content to be displayed in the belonging tenant 721 is similar to the belonging tenant 701 of FIG. 7A, description will be omitted. A value to be displayed as an option in a priority setting selection region 722 is a value of the setting name 533 of a record that has the value displayed in the belonging tenant 721 as a value of the belonging tenant 532. Here, attention need only be paid to a record whose value of the belonging tenant 532 is "common". Here, it can be understood that the values "S0-1" and "S0-2" of the setting name 533 whose value of the belonging tenant 532 of FIG. 5B are "common" will be options of the priority setting selection region 722. In addition, when the priority setting screen 720 is displayed, a setting name of a record for which "TRUE" is set as an initial value in the priority setting 534 is selected. In the priority setting selection region 722, the user selects setting information to be prioritized in the belonging tenant 721. When an OK button 723 is pressed, the CS program 300 describes "TRUE" in the priority setting 534 of the setting information that has the setting name selected in the priority setting selection region 722. Furthermore, "FALSE" is described in another priority setting 534 of the same tenant, and then the priority setting screen 720 ends. When a cancel button 724 is pressed, the CS program 300 discards the editing result of the priority setting screen 720 and ends the priority setting screen 720.

Next, a process for registering a device in the CS 109 will be described with reference to FIGS. 8A, 8B and 9A and 9B. The process for registering a device in the CS 109 is initiated by the user registering the device activating the printer management application 350 as described in FIGS. 9A and 9B on the client terminal 101.

In the first embodiment, an example in which the printer management application 350 and the CS 109 communicate with the device 102 is described; however, as described in FIG. 1, there may be a plurality of devices in the present system. A case where the printer management application 350 and the CS 109 communicate with a plurality of devices (e.g., the device 103 and the device 104) can be similarly described.

FIGS. 8A and 8B are flowcharts for explaining a process of the CS 109, the client terminal 101, and the device 102 when registering the device in the CS 109 according to the first embodiment.

Prior to the process for registering a device, in step S801, the administrator of the CS 109 first creates common setting information of the CS 109 by using the editing screen 700 and registers it in the setting information management table 530. In addition, in step S802, the administrator of each tenant may also create, as necessary, setting information for the tenant that they manage by using the editing screen 700 and register it in the setting information management table 530. Then, when the printer management application 350 is started, an application screen 901 of FIG. 9A is first displayed.

Figure 9A:
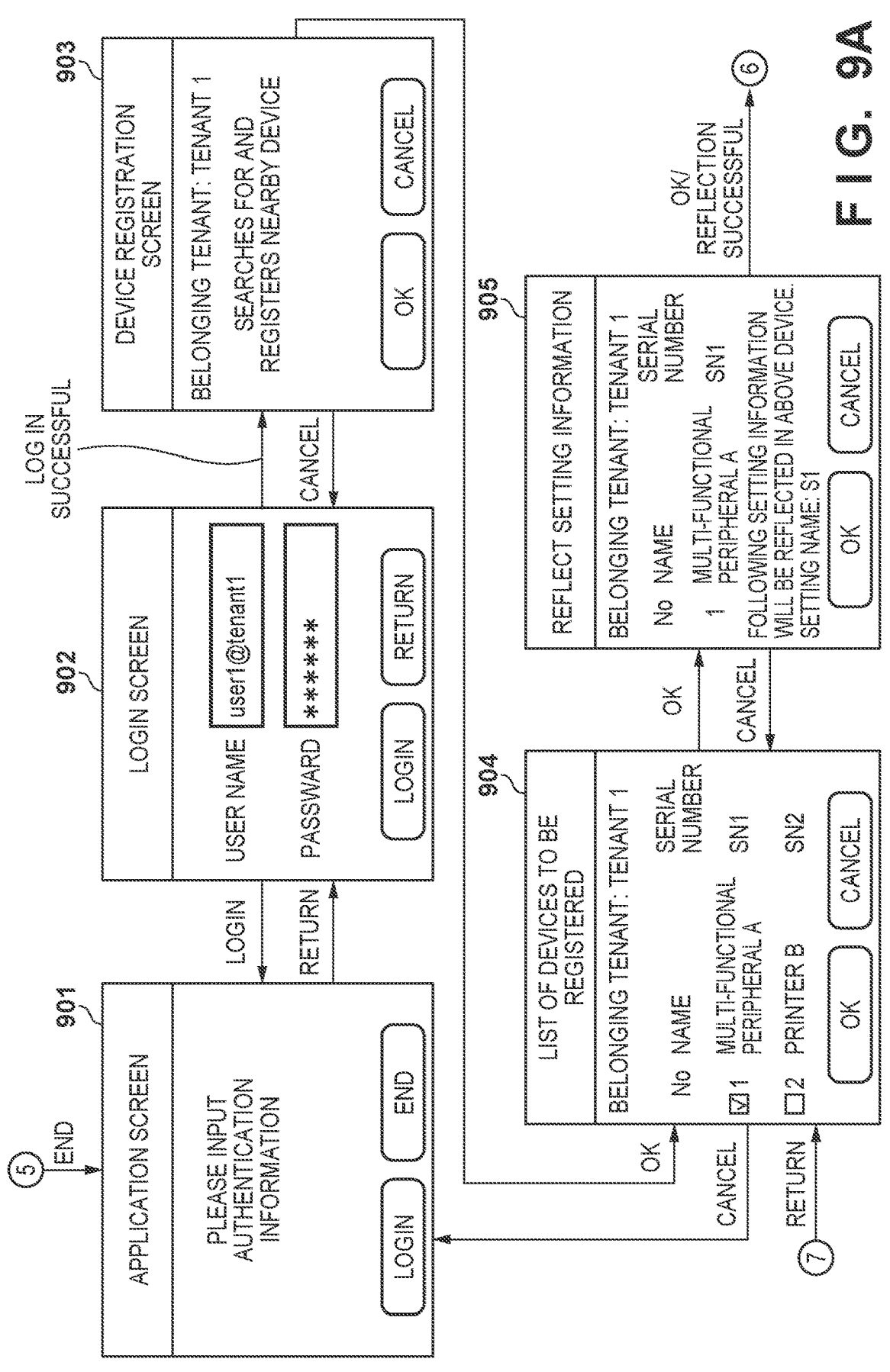

FIGS. 9A and 9B are diagrams for describing an example of transition of a UI screen of the printer management application 350 executed in the client terminal 101 according to the first embodiment.

Upon the user pressing a login button of the application screen 901, the printer management application 350 displays a login screen 902. Then, in step S803, upon the user inputting an account and a password in a predetermined region of the login screen 902 and pressing a login button, authentication information is transmitted to the CS 109. Upon thus receiving the authentication information from the client terminal 101, in step S804, the CS 109 references the authentication information management table 510, determines whether authentication is possible with the received authentication information, and transmits a result to the client terminal 101. If the authentication is successful, a tenant identifier (hereinafter, referred to as TID) of a tenant to which the user belongs is transmitted together.

Upon the authentication thus succeeding, the printer management application 350 of the client terminal 101 displays a device registration screen 903. Here, upon the user pressing an OK button on the screen 903, in step S805, the printer management application 350 searches for a device connected to the network. Although this search process can be realized using Simple Network Management Protocol (SNMP), another method, such as near-field communication (NFC), can also be used.

Upon receiving this search request, in step S806, the device 102 returns device information. The device information returned here need to include at least a serial number of the device. In addition, a device name, a device ID, network information, or the like may be included. Upon thus receiving the device information returned by the device 102, in step S807, the printer management application 350 displays a search result on a list-of-devices-to-be-registered screen 904. Here, two devices whose names are "multi-functional peripheral A" and "printer B" are displayed as the search result.

Next, when the user selects one or more devices to be registered on the list-of-devices-to-be-registered screen 904 and presses an OK button in step S808, the process proceeds to step S809. In FIG. 9A, "the multi-functional peripheral A" is selected. Meanwhile, upon the user pressing a cancel button on the screen 904, the printer management application 350 terminates the present flowchart. When the OK button of the list-of-devices-to-be-registered screen 904 is pressed, in step S809, the printer management application 350 transmits a request for obtaining setting information of the device selected in step S808 to the CS 109. At that time, the tenant identifier (TID) of the tenant to which the user of the client terminal 101 belongs received in step S803 is also transmitted to the CS 109.

Upon thereby receiving the request for obtaining setting information in step S810, in step S811, the CS 109 determines whether setting information is registered in a tenant that corresponds to the received TID. Specifically, it is confirmed whether a tenant that is the same as the received TID is registered in the belonging tenant 532 of the setting information management table 530. If it is determined here that the tenant is registered, the process proceeds to step S812, and if the tenant is not registered, the process proceeds to step S813. In step S812, the CS 109 designates setting information of the tenant that corresponds the TID as setting information to be applied to the device. Specifically, the CS 109 extracts a record whose value of the belonging tenant 532 coincides with the TID from among respective records in the setting information management table 530 and confirms a value of the priority setting 534. Then, the CS 109 identifies a record whose value of the priority setting 534 is "TRUE". Then, finally, the CS 109 extracts setting information of the FW version 535 to another CS connection 540 of the record and generates, for example, the setting information file 600 as illustrated in FIG. 6. FIG. 6 illustrates an example of a setting information file that is based on a record whose belonging tenant 532 of the setting information management table 530 is "common" and value of the priority setting 534 is TRUE.

Meanwhile, if a tenant that is the same as the TID is not registered, in step S813, the CS 109 designates the common setting information as the setting information to be applied to the device. Specifically, the CS 109 extracts a record whose value of the belonging tenant 532 is "common" from among respective records in the setting information management table 530 and confirms a value of the priority setting 534. Then, the CS 109 identifies a record whose value of the priority setting 534 is "TRUE". Then, finally, the CS 109 extracts setting information of the FW version 535 to another CS connection 540 of the record and generates, for example, the setting information file 600.

When the setting information file is thus created in step S812 or S813, the CS 109 proceeds to step S814 and returns the setting information to the printer management application 350 as a response to the setting information obtaining request of step S809. At that time, the value of the setting name 533 corresponding to the setting information is obtained from the setting information management table 530 and is also returned to the printer management application 350.

Upon the setting information and the setting name thereby being received in step S815, the printer management application 350 displays a device in which the setting information is to be reflected and the setting name of the setting information to be reflected on a setting information reflected screen 905 of FIG. 9A. Then, if the user presses an OK button in the setting information reflected screen 905, the process proceeds to step S816. Meanwhile, upon the user pressing a cancel button on the screen 905, the printer management application 350 returns to the list-of-devices-to-be-registered screen 904. In step S816, the printer management application 350 transmits the setting information received in step S815 to the device (e.g., the device 102 (the multi-functional peripheral A)) selected in step S808.

Upon receiving the setting information in step S817, the device 102 reflects the received setting information therein. The setting information is reflected in the setting information of the MFP control program 401 of the device via the setting management service 405 of the multi-functional peripheral software 400. Then, the device 102 returns a reflection result to the printer management application 350.

Upon receiving the reflection result from the device 102 in step S816, in step S818, the printer management application 350 determines whether the setting information can be reflected in the device 102. If reflection of the setting information is successful, the process proceeds to step S819 and a reflection success screen 906 is displayed. Meanwhile, if it is determined that reflection of the setting information has failed, the process proceeds to step S820 and a reflection failure screen 907 is displayed. When a return button is pressed on the reflection failure screen 907, the list-of-devices-to-be-registered screen 904 is returned to. When a registration button of the reflection success screen 906 is pressed in step S819, the printer management application 350 transmits a device registration request to the CS 109. At that time, the TID received in step S803 and the device information obtained in step S805, which includes the serial number, is also transmitted to the CS 109.

Upon receiving this device registration request, in step S821, the CS 109 registers the device information in a tenant to which the received TID belongs. Specifically, a new record is added to the serial number management table 550 and the received serial number is stored as a value of the serial number 551 of the record. Similarly, the received TID is stored as a value of the belonging tenant 552. When a serial number is thus stored in the serial number management table 550, the registration result is "successful". Meanwhile, when the serial number is not stored in the serial number management table 550 due to, for example, the DB 308 access error, the registration result is "failed". Then, the registration result is returned to the printer management application 350.

Upon thus receiving a response from the CS 109, the printer management application 350 displays a registration success screen 908 (when registration is successful) or a registration failure screen 909 (when registration has failed). When an end button is pressed on the registration success screen 908, in step S822, the printer management application 350 transmits a CS registered notification to the device 102 and returns to the application screen 901. Upon thereby receiving a CS registered notification from the printer management application 350 in step S823, the device 102 starts communication with the CS 109. Generally, the device 102 executes process for polling the CS 109 at a predetermined period (steps S824 and S825). Meanwhile, when an end button is pressed on the registration failure screen 909, the application screen 901 is returned to. This concludes the description of the flowcharts of FIGS. 8A and 8B.

As described above, according to the first embodiment, by step S809 to step S817 of FIGS. 8A and 8B being executed, the device 102 enters a state in which appropriate security setting information has been applied prior to being connected to the CS 109. As a result, the device 102 can communicate with the CS 109 in a highly secure state from an initial stage of communication. In addition, since the device 102 to which the security setting information has been applied is connected to the CS 109, a risk of various cyberattacks on the CS 109 that may be performed via the device can be reduced.

Second Embodiment

In the first embodiment, the user could select any device from among the one or more devices searched for in the printer management application 350 and reflect the setting information and register the setting information in the CS 109. However, since this depends on the user's manual selection, the user selecting a wrong device may result in unnecessary setting information being reflected in a device that is not to be registered in the CS 109 or unnecessary device being registered in the CS 109.

Therefore, in a second embodiment, an example in which it is possible for the user of the printer management application 350 to register only a device to be registered in the CS 109 and reflect setting information only in that device will be described. Portions different from the first embodiment will be mainly described below. Since a system configuration according to the second embodiment, a hardware configuration of each apparatus, and the like are similar to those of the first embodiment described above, descriptions thereof will be omitted.

FIG. 10A is a diagram illustrating an example of a serial number management table 1000 managed by the CS 109 according to the second embodiment. A configuration of the serial number management table 1000 of FIG. 10A is one example and may be a table configuration that is different from the present example. The serial number management table 1000 is the serial number management table 550 of the first embodiment to which a registering status 1001 has been added.

The registering status 1001 represents a status of registration of a device that has a serial number stored in a respective record in the CS 109. Either value, "completed" or "preparatory", is stored in the registering status 1001. "Completed" represents that a device that corresponds to the serial number has already been registered in the CS 109, and "preparatory" represents that a device corresponding to the serial number is not currently registered in the CS 109 but is scheduled to be registered in the future.

FIG. 10B is a diagram illustrating an example of a registration screen 1020 to be displayed by the CS 109 according to the second embodiment. When registering a device in the CS 109, an administrator of respective tenants of the CS 109 preregisters a serial number of the device by using this screen. In this screen, since content to be displayed on a belonging tenant 1021 is similar to that of the belonging tenant 701 of aforementioned FIG. 7A, description thereof will be omitted. The user inputs a serial number of a device registered in the belonging tenant 1021 (here, tenant 1) in a serial number input region 1022. When an OK button 1023 is pressed in this screen, the CS program 300 adds a new record to the serial number management table 1000. Then, a value (here, SN01) of the serial number input region 1022 is stored in the serial number 551, and a value (tenant 1) of the belonging tenant 1021 is stored in the belonging tenant 552. In addition, "preparatory", which indicates that a target device is scheduled to be registered in the future, is stored in the registering status 1001. The information thus registered is indicated by a record 1002 in FIG. 10A. Then, the registration screen 1020 is ended. Meanwhile, when a cancel button 1024 is pressed, the CS program 300 discards an editing result of the registration screen 1020 and ends the registration screen 1020.

Next, a process for registering a device in the CS 109 according to the second embodiment will be described with reference to FIGS. 11A and 11B.

FIGS. 11A and 11B are flowcharts for explaining a process of the CS 109, the client terminal 101, and the device 102 when registering the device in the CS 109 according to the second embodiment. In FIGS. 11A and 11B, since steps S801 to S805 and steps after S808 are similar to the process described in FIGS. 8A and 8B of the first embodiment, descriptions thereof will be omitted.

In step S1101, the CS 109 (CS program 300) displays the registration screen 1020 (FIG. 10B) based on an instruction from the user. Upon the user inputting a serial number of a device to be preregistered in this screen and presses the OK button 1023, the CS 109 stores the serial number inputted by the user, a belonging tenant, and a value "preparatory" of a registering status in the serial number management table 1000. This process is not essential and may be performed as necessary.

Since the process of step S803 to step S806, which is executed when the printer management application 350 is started is similar to the process illustrated in FIG. 8A of the first embodiment, description thereof will be omitted.

Then, subsequent to steps S805 and S806, in step S1102, the printer management application 350 transmits a request for obtaining serial number information of the device registered in the CS 109. At this time, the TID received in step S803 is also transmitted to the CS 109.

Upon thus receiving the serial number information obtaining request in step S1103, the CS 109 extracts a record whose value of the belonging tenant 552 of the serial number management table 1000 coincides with the received TID. Then, a value of the serial number 551 and a value of the registering status 1001 of the extracted record are obtained. Then, finally, the obtained serial number and registering status are made into a list and transmitted to the printer management application 350.

As a result, in step S1104, the printer management application 350 receives the device information that one or more devices, such as the device 102, returned in step S806 and a list of serial number and the registering status (hereinafter, referred to simply as the list) that the CS 109 returned in step S1103. Then, it is determined whether there is a combination in which a value of the registering status is "preparatory" in that list. If it is determined that there is the combination in which a value of the registering status is "preparatory" in the list, the process proceeds to step S1105; otherwise, the process proceeds to step S1107. In step S1105, the printer management application 350 extracts a serial number that coincides with a serial number whose value of the registering status in the list is "preparatory" from among serial numbers included in the device information returned in step S806. Then, the process proceeds to step S1106, and only a device that has the extracted serial number is displayed on the list-of-devices-to-be-registered screen 904 of FIG. 9A, and the process proceeds to step S808 of FIG. 8A.

Meanwhile, in step S1107, the printer management application 350 extracts a serial number that coincides with a serial number whose value of the registering status 1001 in the list is "completed" from among serial numbers included in the device information returned in step S806. Then, the process proceeds to step S1108, and those other than a device that has the extracted serial number are displayed on the list-of-devices-to-be-registered screen 904, and the process proceeds to step S808 of FIG. 8A.

When the printer management application 350 thus performs a procedure of steps S1105 and S1106, only devices preregistered in the CS 109 are displayed on the list-of-devices-to-be-registered screen 904. Meanwhile, when the printer management application 350 performs a procedure of steps S1107 and S1108, only devices other than devices that have been registered in the CS 109 are displayed on the list-of-devices-to-be-registered screen 904.

When the procedure of steps S1105 and S1106 is performed, it places a burden on the user to preregister a serial number of a device in the CS 109 by executing step S1101; however, only a device scheduled to be registered can be selected in the list-of-devices-to-be-registered screen 904 without error. Meanwhile, when the procedure of steps S1107 and S1108 is executed, it is possible to exclude in advance devices registered in the CS 109 from display of the list-of-devices-to-be-registered screen 904, and so, it is possible to prevent registered devices from being erroneously double-registered. At the same time, it eliminates the burden of pre-registration, such as that in step S1101, and it becomes possible to simplify the procedure for registering a device in the CS 109.

In either case, it becomes possible to register only a device that the user of the printer management application 350 wishes to register in the CS 109 as described at the beginning of the second embodiment. The process of step S1109 to be executed after the list-of-devices-to-be-registered screen 904 is displayed corresponds to the process of step S808 to step S825 of FIGS. 8A and 8B, these are similar to the process described in FIGS. 8A and 8B of the first embodiment described above, so description thereof will be omitted. This concludes the description of the present flowchart.

As described above, according to the second embodiment, by the process of step S1101 to step S1108 being executed, it becomes possible for the user of the printer management application 350 to avoid selecting a wrong device. As a result, it becomes possible to avoid reflecting unnecessary setting information in a device not to be registered in the CS 109 and registering unnecessary device in the CS 109.

Third Embodiment

In the above-described first and second embodiments, the user can register a device selected using the printer management application 350 in the CS 109 after reflecting setting information in the selected device. However, in the first and second embodiments, the printer management application 350 reflects setting information in a device before registering it in the CS 109. Thus, when registration is canceled after registration in the CS 109, unnecessary setting information remains reflected in the device.

Therefore, in a third embodiment, an example in which unnecessary setting information of a device can be reverted to the original when the user cancels registration after registration in the CS 109 will be described. Portions different from the first and second embodiments will be mainly described below. Since a system configuration according to the third embodiment, a hardware configuration of each apparatus, and the like are similar to those of the first and second embodiments described above, descriptions thereof will be omitted.

FIG. 12A is a diagram illustrating an example of a serial number management table 1200 managed by the CS 109 according to the third embodiment. A configuration of the table of FIG. 12A is one example and may be a table configuration that is different from the present example. The serial number management table 1200 is the serial number management table 1000 of the second embodiment to which saving information 1201 has been added; however, the registering status 1001 is not essential in the third embodiment. For example, description can be given using the serial number management table 550 of the first embodiment to which the saving information 1201 has been added.

Setting information immediately before a target device has been registered in the CS 109 is stored in the saving information 1201. Here, although it is assumed that an actual file in the format of the setting information file 600 is stored, a path to the actual file may be stored instead of the actual file being stored. In this case, a configuration is taken so as to place the actual file as a file in a separate location. In addition, respective setting items may be individually defined in columns such as in the FW version 535 to another CS connection 540 of the setting information management table 530 of FIG. 5B.

FIG. 12B is a diagram illustrating an example of a device deletion screen 1220 to be displayed by the CS 109 according to the third embodiment. When deleting a device registered in the CS 109, an administrator of respective tenants of the CS 109 deletes a serial number of the device by using this screen. In this screen, since content to be displayed on a belonging tenant 1221 is similar to that of the belonging tenant 701 of FIG. 7A, description thereof will be omitted. A value to be displayed as an option in a serial number region 1222 is a value of the serial number 551 of a record that has a value displayed in in the belonging tenant 1221 as a value of the belonging tenant 532 of the setting information management table 530 and whose value of the registering status 1001 is "completed". However, when there is no registering status 1001 in the serial number management table 1200, the registering status 1001 is not referenced. In the example of the serial number management table 1200 of FIG. 12A, "SN11" and "SN12" whose belonging tenant is "tenant 1" are options. The user selects a serial number of a device to be deleted in the serial number region 1222. In FIG. 12B, the serial number "SN11" is selected. Then, when an OK button 1223 is pressed, the CS program 300 transmits a deletion instruction to a device that has the serial number selected in the serial number region 1222. In addition, when a cancel button 1224 is pressed, the CS program 300 discards an editing result of the deletion screen 1220 and closes the deletion screen 1220.

Next, a process for registering a device in the CS 109 according to the third embodiment will be described with reference to FIGS. 13A and 13B.

FIGS. 13A and 13B are flowcharts for explaining a process of the CS 109, the client terminal 101, and the device 102 when registering the device in the CS 109 according to the third embodiment. In FIGS. 13A and 13B, since the process of step S801 to step S815 and step S1101 to step S1108 to be executed in step S1300 is similar to the process described in the above-described first and second embodiments, description thereof will be omitted. When these processes are executed, the printer management application 350 executes step S1301 to step S1308. These processes are executed by the printer management application 350 in step S816 before transmitting setting information to a selected device.

The process of step S1301 to step S1308 is a process from the printer management application 350 transmitting a setting information save request to the device 102 until receiving a result thereof from the device 102. First, the printer management application 350 receives device setting information from the CS 109 in step S815 and then, upon detecting that an OK button of the setting information reflected screen 905 of FIG. 9A has been pressed, in step S1301, transmits a setting information save request to the device (e.g., the device 102) selected in step S808.

As a result, the device 102 receives the setting information save request in step S1302 and determines whether there is a setting information save region in the device itself in step S1303. This save region is assumed to be provided in the setting management service 405; however, an independent region may be provided. Here, if it is determined that there is the save region, the process proceeds to step S1304, and the current setting information is saved in the save region as saving information, and the process proceeds to step S1306. Meanwhile, if it is determined that there is no save region, the process proceeds to step S1305, the current setting information is converted into a file as saving information and temporarily stored in the setting management service 405, and the process proceeds to step S1306. The saving information is assumed to have a format of the setting information file 600 as illustrated in FIG. 6; however, the present invention is not limited thereto.

Upon thus deciding handling of the saving information according to step S1304 or S1305, in step S1306, the device 102 returns a setting information save result to the printer management application 350 as a response to step S1301. Here, when step S1305 is passed through, a serial number of the device itself and a saving information file are also returned.

As a result, in step S1307, the printer management application 350 receives the setting information save result and determines whether the save result is successful. If a saving information file is also received when the result is received in step S1307, the printer management application 350 associates the saving information file with the serial number and temporarily stores the saving information file in the setting management module 353. Then, the process proceeds to step S1308, and if the save result is successful, the printer management application 350 advances the process to step S816, and if the save result is failed, the printer management application 350 advances the process to step S820. Then, subsequent thereto, the process of step S816 to step S818 to be executed is similar to the process described in the above-described first and second embodiments, and so, description thereof will be omitted.

Then, in step S818, when it is determined that reflection of the setting information in the device 102 is successful, the printer management application 350 executes step S1309. In the process of step S1309, in addition to the process of step S819 of the above-described first and second embodiments, if there is a saving information file temporarily saved in step S1307, the saving information file is also transmitted to the CS 109.

As a result, in step S1310, the CS 109 receives a device registration request. Then, the process proceeds to step S1311, and the CS 109 determine whether a saving information file has also been received. Here, if a saving information file is received, the process proceeds to step S1312, the received saving information file is stored in the saving information 1201 of the serial number management table 1200, and the process proceeds to step S1313. A record stored here is a record whose value of the serial number 551 of the serial number management table 1200 coincides with a serial number included in the device information received in step S1310. The CS 109 executes the device registration process described in step S821 of the first and second embodiments in step S1313, returns a device registration result to the client terminal 101 in step S1314, and then proceeds to step S1316.

Upon receiving a response from the CS 109, in step S1315, the printer management application 350 presents to the user whether registration of the device has succeeded or failed by displaying a registration success screen 908 (if registration is successful) or a registration failure screen 909 (if registration fails) and proceeds to step S1316. Since step S1316 is similar to the process of step S822 to step S825 of the first and second embodiments, description thereof will be omitted.

Next, a process for deleting a device in the CS 109 will be described with reference to FIG. 14.

Figure 14:
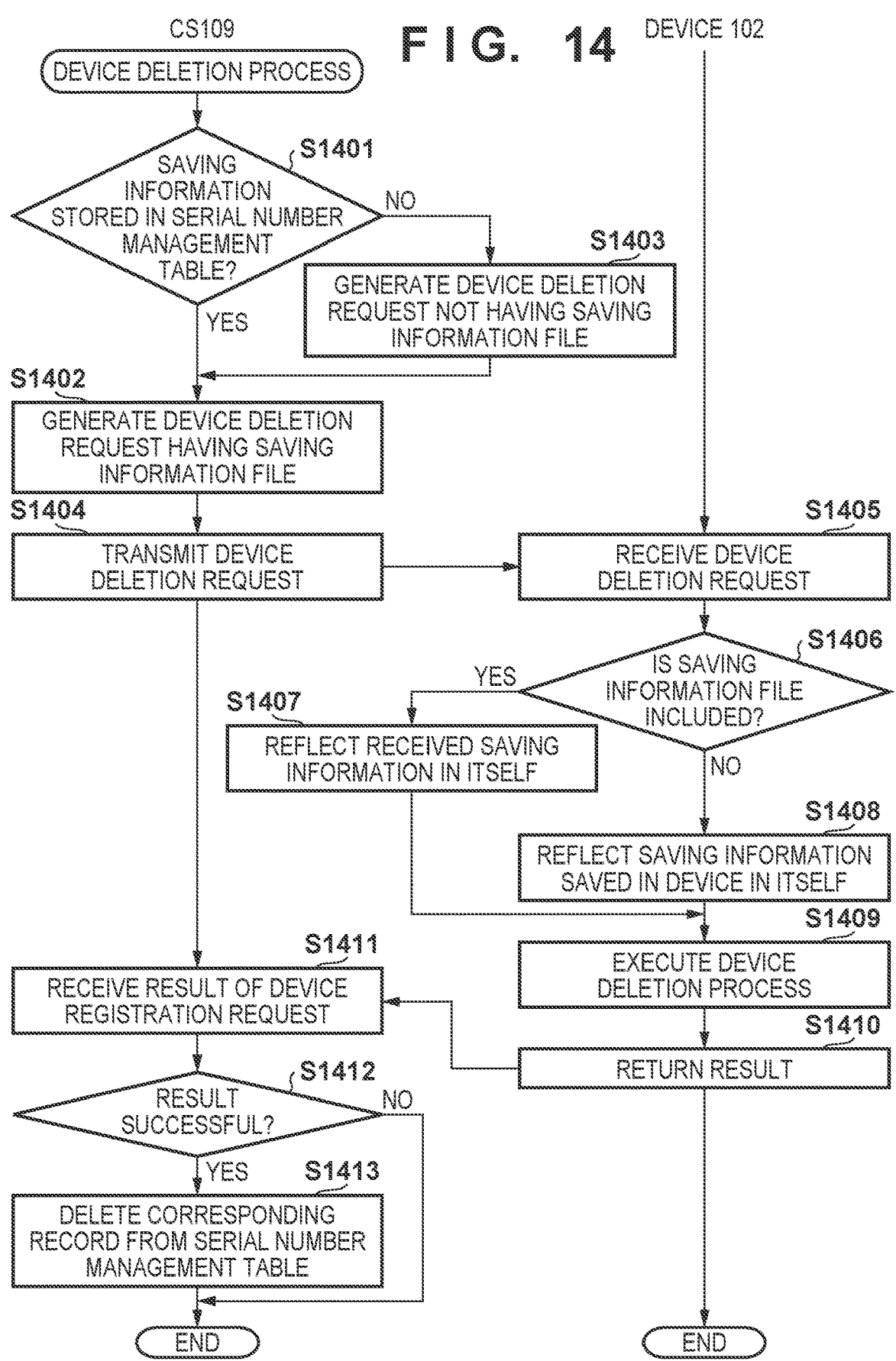
FIG. 14 is a flowchart for explaining a process for deleting the device by the CS and the device according to the third embodiment.

FIG. 14 is a flowchart for explaining a process for deleting a device by the CS 109 and the device 102 according to the third embodiment.

The process for deleting a device from the CS 109 is started by an administrator of a tenant to which a device to be deleted belongs designating a serial number of the device to be deleted in the serial number region 1222 of the deletion screen 1220 and pressing the OK button 1223. Here, description will be given assuming that a serial number of the device 102 has been designated.

When the OK button 1223 is pressed, in step S1401, the CS 109 extracts a record whose value of the serial number 551 of the serial number management table 550 coincides with the serial number selected in the serial number region 1222. Then, it is determined whether a saving information file is stored in the saving information 1201 of the record. If the saving information file is stored, the process proceeds to step S1402, and the CS 109 retrieves the saving information file from a record with the corresponding saving information 1200, generates a device deletion request that includes the file, and proceeds to step S1404. Meanwhile, if the saving information file is not stored, the process proceeds to step S1403, and the CS 109 generates a device deletion request that does not include a saving information file and the process proceeds to step S1404. In step S1404, the CS 109 transmits the device deletion request to the device 102.

Upon thereby receiving the device deletion request in step S1405, the device 102 proceeds to step S1406 and determines whether the device deletion request includes a saving information file. If the saving information file is included, the process proceeds to step S1407, and the device 102 reflects the received saving information file in itself and the process proceeds to step S1409. Meanwhile, if the saving information file is not included, the process proceeds to step S1408, and the device 102 retrieves a saving information file saved in the save region in step S1304, reflects the saving information file in itself, and the process proceeds to step S1409. Since the saving information file reflection process to be executed in step S1407 or S1408 is similar to step S817 of the first embodiment, description thereof will be omitted. By thus executing step S1406 to step S1408, the device 102 can return its setting information to a state before registering the device in the CS 109. Then, in step S1409, the device 102 executes the device deletion process. In this deletion process, the device 102 at least stops the process for polling the CS 109. In addition, information for accessing the CS 109 (such as authentication information and a URL) may be deleted. Then, the process proceeds to step S1410, and the device 102 returns a result of the device deletion process to the CS 109 as a response to the device deletion request of step S1404.

Upon thus receiving the result of the device deletion request in step S1411, the process proceeds to step S1412 and the CS 109 determines whether the result is successful. If the result is successful, the process proceeds to step S1413, and the CS 109 deletes a record that stores a serial number of the corresponding device from the serial number management table 1200 and terminates the process. Meanwhile, if the result is failed, the CS 109 terminates the process as is without changing the serial number management table 1200.

As described above, according to the third embodiment, when deleting registration of a device on the CS 109, administrators of respective tenants of the CS 109 can return setting information of the device to a state before registration in the CS 109. As a result, it is possible to avoid unnecessary setting information remaining reflected in the device.

Fourth Embodiment

In the above-described first to the third embodiments, the printer management application 350 executes the device registration process independently for respective devices to be registered in the CS 109. That is, if the user selects a plurality of devices and performs a process for registration in the CS 109, the printer management application 350 processes success or failure of registration in the CS 109 for each of the individual devices.

However, when it is desired to handle a plurality of devices in a user environment in a unified manner, if registration of some devices in the CS 109 fails, devices that have been registered in the CS 109 and devices for which registration failed are mixed in the user environment. As a result, devices of the user cannot be handled in a uniform manner on the CS 109.

Therefore, in a fourth embodiment, an example in which the printer management application 350 can register a plurality of devices in the CS 109 in one batch according to an instruction of the user will be described. Hereinafter, for the sake of descriptive simplicity, portions different from the first embodiment will mainly be described. Since a system configuration according to the fourth embodiment, a hardware configuration of each apparatus, and the like are similar to those of the first to third embodiments described above, descriptions thereof will be omitted.

FIG. 15 is a flowchart for explaining a process for batch registration of devices in the CS 109 by the client terminal 101 and the device 102 according to the fourth embodiment.

Figure 16A:
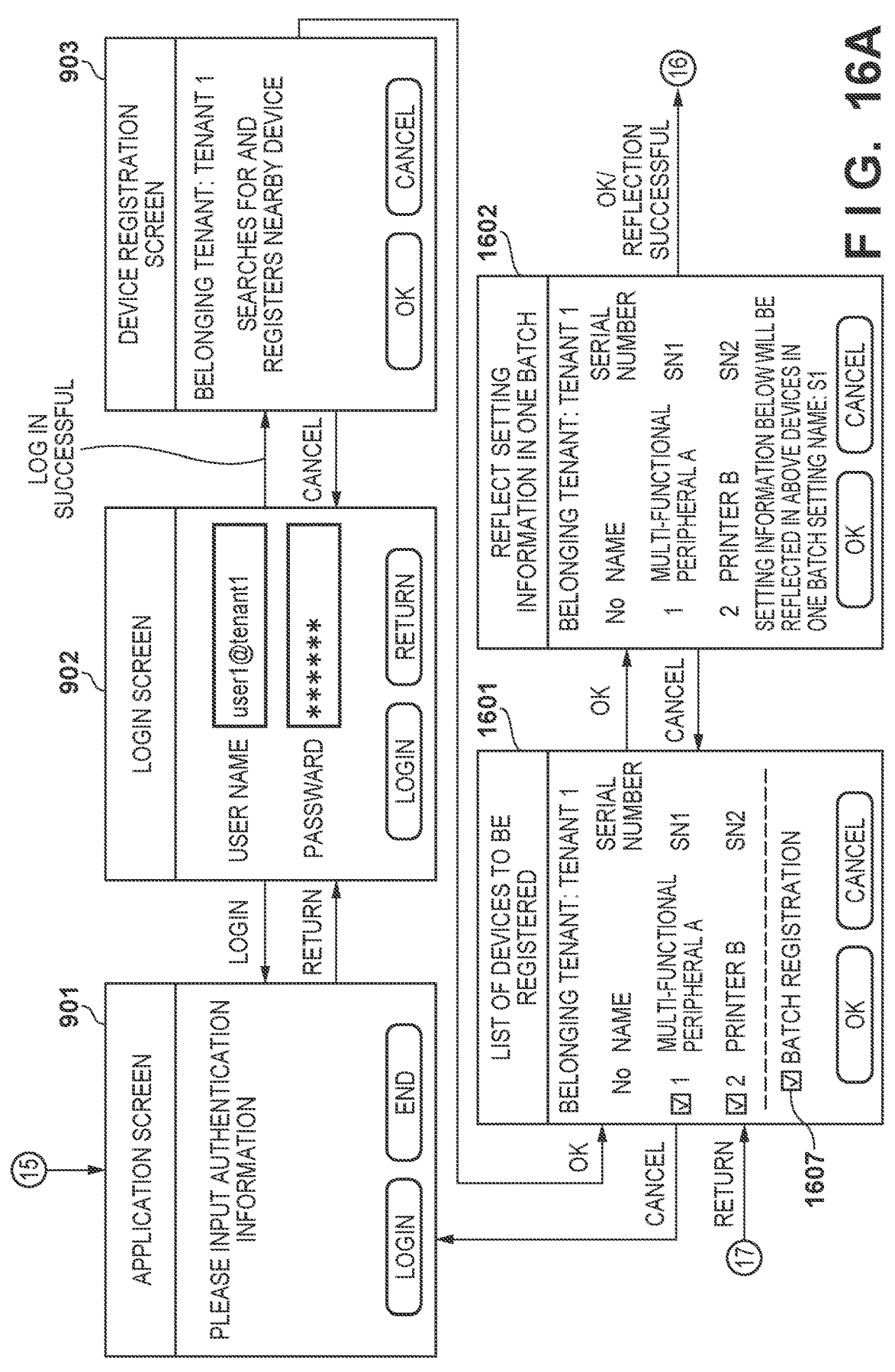

FIGS. 16A and 16B are diagrams illustrating an example of transition of a UI screen of the printer management application 350 executed in the client terminal 101 according to the fourth embodiment. Although most of the screens in FIGS. 16A and 16B are the same as those in FIGS. 9A and 9B, some of the screens have been changed for the batch registration process.

For example, regarding a list-of-devices-to-be-registered screen 1601, a checkbox 1607 for the user to designate batch registration has been added to the list-of-devices-to-be-registered screen 904 of FIG. 9A. In addition, regarding screens 1602 to 1606, text displayed in the setting information reflected screen to the registration failure screen 909 of FIG. 9B has been changed to those for the batch registration process.

The process for batch registration of devices in the CS 109 described in FIG. 15 is started by the user that registers devices starting the printer management application 350 as described in FIGS. 16A and 16B on the client terminal 101. In step S1501 of FIG. 15, the same process as step S801 to step S807 of above-described FIG. 8A is performed. Since this process is similar to the description of the first embodiment, description will be omitted.

Next, in step S1502, upon detecting that the user has selected a plurality of devices to be registered on the list-of-devices-to-be-registered screen 1601, made appropriate input in the checkbox 1607 for batch registration, and pressed the OK button, the process proceeds to step S1503 and the printer management application 350 executes step S809 to step S815 of FIGS. 8A and 8B. Since these processes are similar to the processes described in the first embodiment, description will be omitted. Then, the process proceeds to step S1504, and the printer management application 350 determines whether the checkbox 1607 for batch registration has been checked in step S1502. When it is determined that the checkbox 1607 for batch registration has been checked, the process proceeds to step S1505, and the processes of step S1301 to step S1308 of FIG. 13A and steps S816 and S817 of FIG. 8B are executed. Since these processes are similar to the processes described in the first and third embodiments, descriptions thereof will be omitted. Then, the process proceeds to step S1507. Meanwhile, when it is determined in step S1504 that the checkbox 1607 for batch registration has not been checked, the process proceeds to step S1506, step S816 to step S825 of FIG. 8B are executed, and the process ends. Since these processes are similar to the processes described in the first embodiment, description will be omitted.

In step S1507, the printer management application 350 determines whether the setting information has been reflected in all the devices selected in step S1502. If it is determined that the setting information has been reflected in all the devices, the process proceeds to step S1509, and the printer management application 350 executes step S819 to step S825 for each selected device, registers the target devices in the CS 109, and terminates the process. At this time, the printer management application 350 displays a batch registration success screen 1605 for notifying the user that device batch registration is successful.

Meanwhile, otherwise, the process proceeds to step S1508, and the printer management application 350 transmits a saving information reflection request to a device whose setting value has been changed. Specifically, the printer management application 350 extracts saving information that coincides with a serial number of a device in which setting information has been reflected from the setting management module 353. If saving information has previously been obtained from a device in step S1307, the printer management application 350 would have temporarily stored the saving information in the setting management module 353. If there is saving information, a saving information reflection request to which the saving information has been attached is transmitted to a device with a corresponding serial number. If there is no saving information, only a saving information reflection request is transmitted to a device with a corresponding serial number. Thus, in step S1510, the device (e.g., device 102) receives the saving information reflection request from the printer management application 350. Next, in step S1511, step S1406 to step S1408 of FIG. 14 are executed and the saving information is reflected in the device itself. Since these processes are similar to the processes described in the third embodiment, descriptions thereof will be omitted. Then, the process proceeds to step S1512, and the device returns a result of the saving information reflection request to the printer management application 350 and terminates the process.

Upon receiving the result of the saving information reflection request in step S1513, the process proceeds to step S1514 and the printer management application 350 displays the batch registration failure screen 1606 to notify the user that batch registration of devices has failed. When an end button is pressed on the screen 1606, the application screen 901 is returned to. This concludes the description of the present flowchart.

As described above, according to the fourth embodiment, the user can register target devices in the CS 109 only when setting information has been successfully reflected in all the devices selected by the user. As a result, a plurality of devices in the user environment can be handled uniformly on the CS 109.

In addition, according to the above-described first to fourth embodiments, a device for which security settings have been performed is connected to a CS; therefore, there is the effect of it being possible to reduce the risk of various cyberattacks on the CS that may be performed via the device.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (the CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (the RAM), a read only memory (the ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-165022, filed Oct. 13, 2022, which is hereby incorporated by reference herein in its entirety.

What is claimed is:

1. An information processing apparatus operable to register a device in a server, the information processing apparatus comprising:

a controller including one or more memories storing instructions and one or more processors configured to execute the instructions, the controller configured to:

transmit, to the server, authentication information for a login process on the server;

upon success of the login process, search for a device connected to the information processing apparatus having transmitted, to the server, the authentication information resulting in the success of the login process on the server;

in response to an instruction for registering a found device connected to the information processing apparatus, make a first request to the server for setting information without making a second request to the server to register the found device connected to the information processing apparatus;

transmit, to the found device connected to the information processing apparatus, the setting information obtained from the server in response to the first request, wherein the setting information includes common setting information designated by an administrator as settings to be reflected to the found device, and the settings include a security setting for communication between the server and the found device and a setting related to a firmware automatic update of the found device;

determine whether the setting information has been reflected in the found device connected to the information processing apparatus; and upon determining that the setting information has been reflected in the found device connected to the information processing apparatus, transmit, to the server, identification information of the found device connected to the information processing apparatus and make the second request to the server to register the found device connected to the information processing apparatus.

2. The information processing apparatus according to claim 1, wherein in the device search, the controller is configured to, upon the success of the login process, display a registration screen and, in response to an instruction from a user via the registration screen, search for the device connected to the information processing apparatus.

3. The information processing apparatus according to claim 1, wherein upon the success of the login process, the controller is configured to obtain, from the server, information of a tenant to which a user of the information processing apparatus who logs in the server based on the authentication information belongs.

4. The information processing apparatus according to claim 3, wherein in the making of the first request for the setting information, the controller is configured to include the information of the tenant in the first request.

5. The information processing apparatus according to claim 4, wherein the information of the tenant includes the common setting information and information for a respective tenant.

6. The information processing apparatus according to claim 5, wherein the common setting information obtained from the server in response to the first request for the setting information is setting information corresponding to the information of the tenant included in the first request.

7. The information processing apparatus according to claim 5, wherein the setting information obtained from the server in response to the first request for the setting information, in a case where the server holds setting information of the tenant associated with the authentication information of the information processing apparatus, is setting information of the tenant and, in a case where the server does not hold the setting information of the tenant, is the common setting information.

8. The information processing apparatus according to claim 1, wherein in a case that it is determined that the setting information is not reflected in the found device, the controller is further configured to display a screen indicating that reflection of the setting information has failed.

9. The information processing apparatus according to claim 1, wherein in the making of the second request to register the found device, the controller is further configured to transmit, to the server, information of a tenant of the found device.

10. The information processing apparatus according to claim 1, wherein the controller is further configured to display a screen for displaying information of the found device, and wherein the instruction for registering the device is performed by information of the found device being selected on the screen.

11. The information processing apparatus according to claim 1, wherein the controller is further configured to determine whether there is identification information pre-registered in the server in identification information of found devices, and select, as a device to be registered, a device corresponding to the preregistered identification information if it is determined that there is the preregistered identification information in the identification information of the found devices.

12. The information processing apparatus according to claim 1, wherein the controller is configured to:

in a case where an instruction for registering, in the server in one batch, a plurality of devices found in the device search has been accepted, make a request to the server for setting information including security setting information for the server and the plurality of devices to perform communication, transmit to the plurality of devices the setting information obtained from the server in response to the request for the setting information including the security setting information, and upon determining that the setting information has been reflected in the plurality of devices, transmit identification information of the plurality of devices to the server and make a request for registering the plurality of devices in the server.

13. A method of registering a device, connected to an information processing apparatus, in a server, the method comprising:

transmitting, to the server and by the information processing apparatus, authentication information for a login process on the server;

upon success of the login process, searching, by the information processing apparatus, for a device connected to the information processing apparatus having transmitted, to the server, the authentication information resulting in the success of the login process on the server;

in response to an instruction for registering a found device connected to the information processing apparatus, making a first request to the server for setting information without making a second request to the server to register the found device connected to the information processing apparatus;

transmitting, to the found device connected to the information processing apparatus, the setting information obtained from the server in response to the first request, wherein the setting information includes common setting information designated by an administrator as settings to be reflected to the found device, and the settings include a security setting for communication between the server and the found device and a setting related to a firmware automatic update of the found device;

determining whether the setting information has been reflected in the found device connected to the information processing apparatus; and upon determining that the setting information has been reflected in the found device connected to the information processing apparatus, transmitting, to the server, identification information of the found device connected to the information processing apparatus and making the second request to the server to register the found device connected to the information processing apparatus.

14. The method according to claim 13, wherein the setting information includes security setting information of a tenant to which the found device belongs.

15. A non-transitory computer-readable storage medium storing a program for causing a process to execute a method of registering a device, connected to an information processing apparatus, in a server, the method comprising:

transmitting, to the server and by the information processing apparatus, authentication information for a login process on the server;

upon success of the login process, searching, by the information processing apparatus, for a device connected to the information processing apparatus having transmitted, to the server, the authentication information resulting in the success of the login process on the server;

in response to an instruction for registering a found device connected to the information processing apparatus, making a first request to the server for setting information without making a second request to the server to register the found device connected to the information processing apparatus;

transmitting, to the found device connected to the information processing apparatus, the setting information obtained from the server in response to the first request, wherein the setting information includes common setting information designated by an administrator as settings to be reflected to the found device, and the settings include a security setting for communication between the server and the found device and a setting related to a firmware automatic update of the found device;

determining whether the setting information has been reflected in the found device connected to the information processing apparatus; and upon determining that the setting information has been reflected in the found device connected to the information processing apparatus, transmitting, to the server, identification information of the found device connected to the information processing apparatus and making the second request to the server to register the found device connected to the information processing apparatus.

16. The information processing apparatus according to claim 1, wherein the controller is configured to, in response to the instruction for registering the found device, make the first request to the server for the setting information including firmware version information.

17. The information processing apparatus according to claim 16, wherein the requested security setting includes password setting information, USB connection information, and internet printing protocol (IPP) printing information.

18. The information processing apparatus according to claim 1, wherein the controller is further configured to display a search result of the search for the device connected to the information processing apparatus, the displayed search result including a list-of-devices-to-be-registered screen including a plurality of devices connected to the information processing apparatus, wherein the list-of-devices-to-be-registered screen including the plurality of devices connected to the information processing apparatus further includes selectable information, and wherein the instruction to register the found device is received by the controller in a case where both (i) one device is selected on the list-of-devices-to-be-registered screen and (ii) the selectable information is selected.

19. The information processing apparatus according to claim 18, wherein the selectable information displayed on the list-of-devices-to-be-registered screen includes a button.

* * * * *